US012784629B2

(12) United States Patent
Thielemans et al.

(10) Patent No.: US 12,784,629 B2
(45) Date of Patent: Nov. 3, 2026

(54) COLOR MEASURING AND COLOR ADJUSTING DEVICE

(71) Applicant: STEREYO BV, Nazareth (BE)

(72) Inventors: Robbie Thielemans, Nazareth (BE); Vince Dundee, Glendale, CA (US)

(73) Assignee: STEREYO BV, Nazareth (BE)

( * ) Notice: Subject to any disclaimer, the term of this patent is extended or adjusted under 35 U.S.C. 154(b) by 0 days.

(21) Appl. No.: 19/056,428

(22) Filed: Feb. 18, 2025

(65) Prior Publication Data

US 2025/0265959 A1 Aug. 21, 2025

(30) Foreign Application Priority Data

Feb. 15, 2024 (BE) .................................. 2024/5094
Aug. 30, 2024 (BE) .................................. 2024/5582
Jan. 24, 2025 (EP) .................................. 25153978

(51) Int. Cl.
*G09G 3/20* (2006.01)

(52) U.S. Cl.
CPC ... *G09G 3/2003* (2013.01); *G09G 2320/0242* (2013.01); *G09G 2340/06* (2013.01); *G09G 2354/00* (2013.01); *G09G 2360/145* (2013.01)

(58) Field of Classification Search
CPC .................. G09G 2320/0242; G09G 2340/06
See application file for complete search history.

(56) References Cited

U.S. PATENT DOCUMENTS

| | | | | |
|---|---|---|---|---|
| 9,163,990 | B2 * | 10/2015 | Lianza | G01J 3/524 |
| 9,547,922 | B2 * | 1/2017 | Choi | G06T 11/10 |
| 2002/0159066 | A1 | 10/2002 | Berstis | |
| 2006/0139644 | A1 * | 6/2006 | Kahn | G01J 3/0283 356/406 |
| 2014/0071102 | A1 * | 3/2014 | Pieper | H04N 9/73 345/207 |
| 2016/0357324 | A1 * | 12/2016 | Smith | A45F 5/00 |
| 2018/0218656 | A1 * | 8/2018 | Richards | G06T 5/10 |
| 2020/0020138 | A1 * | 1/2020 | Smith | G06F 3/16 |
| 2022/0003988 | A1 * | 1/2022 | Finlayson | G02B 27/0012 |
| 2022/0148483 | A1 | 5/2022 | Azam et al. | |
| 2023/0032436 | A1 * | 2/2023 | Ábrahám | A61B 3/066 |
| 2023/0282153 | A1 | 9/2023 | Thielemans et al. | |
| 2025/0265959 | A1 * | 8/2025 | Thielemans | G09G 3/2003 |

OTHER PUBLICATIONS

Ammar, Mohammed et al., "An Approach Towards Vision Correction Display and Color blindness", 2022 2nd International Mobile, Intelligent, and Ubiquitous Computing Conference (MIUCC), Jun. 1, 2022, pp. 153-159.

(Continued)

*Primary Examiner* — Bipin Gyawali
(74) *Attorney, Agent, or Firm* — Workman Nydegger

(57) ABSTRACT

Devices, systems, and corresponding methods are provided for measurement of a color being scanned, and providing the name, description, or indication of the scanned color. Further, devices, systems, and corresponding methods are provided for adjustment of color in that another color than the scanned color is proposed and, e.g., displayed on the device, wherein the other color comes close or corresponds to the interpretation of the scanned color, though being different from the scanned color, for a colorblind person.

15 Claims, 11 Drawing Sheets

(56) References Cited

OTHER PUBLICATIONS

Pytlarz, Jaclyn et al., "Perceptual Color Volume—Measuring the Distinguishable Colors of HDR and WCG Displays", Version 7.2, Dolby Laboratories, Inc., as early as Jan. 1, 2023, 10 pages.
You, Je In et al., "Image Processing With Color Compensation Using LCD Display for Color Vision Deficiency", Journal of Display Technology, as early as May 9, 2016, pp. 562-566, vol. 12, No. 6.
Partial Belgian Search Report from Corresponding Belgian Patent Application No. BE202405094, Aug. 12, 2024.
Belgian Search Report from Corresponding Belgian Patent Application No. BE202405582, Oct. 14, 2024.
Partial European Search Report from Corresponding European Patent Application No. EP25153978, Feb. 6, 2025.
Extended European Search Report from Corresponding European Patent Application EP25153978.9, May 7, 2025.

* cited by examiner

COLOR MEASURING AND COLOR ADJUSTING DEVICE

CROSS-REFERENCE TO RELATED APPLICATIONS

This application claims the benefit of and priority to Belgian Patent Application BE 20245094, filed at the Belgian Intellectual Property Office (IPObel) on Feb. 15, 2024, Belgian Patent Application BE 202405582, also filed at the Belgian Intellectual Property Office (IPObel) on Aug. 30, 2024, and European Patent Application EP 25153978.9, filed at the European Patent Office on Jan. 24, 2025, the contents of each of which are expressly incorporated herein by reference.

TECHNICAL FIELD

The invention relates to a device and corresponding method for continuous and accurate measurement of a color (or color surface) being scanned, and herewith providing a description such as the name of the scanned color (of the surface). In particular, the device may comprise a display for displaying the name of the scanned color. The invention further relates to possible adjustment of color in that another color than the scanned color is proposed and, e.g., displayed on the device, wherein the other color comes close or corresponds to the interpretation of the scanned color, though being different from the scanned color, for a person being colorblind. Different types of colorblindness are herewith taken into account.

BACKGROUND OF THE INVENTION

Color vision deficiency (CVD) or colorblindness, as more commonly referred to, is an ocular disorder that hinders people in perceiving and distinguishing certain colors. Whereas total colorblindness is rather rare, a deficiency in identifying colors occurs quite often, and affects in general 8% of men and 0.5% of women. The most common form of colorblindness is red-green, which results from missing or defective red or green photoreceptors in a person's eye. Blue-yellow colorblindness is much less present. The ocular disorder can be acquired at a certain age or genetically inherited at birth. People suffering from CVD or colorblindness experience difficulties in their daily life and activities, amongst which, for example, cooking, playing sports and watching television, during which colors are not perceived as it should, or colors of similar shades easily get blurred and become indistinguishable, i.e. seeing brownish shades instead of red and green. Another typical and often mentioned obstacle for colorblind people is driving and being on the road. Having to distinguish traffic lights and road sign colors is particularly difficult for them at night.

Human color vision is enabled by light reception of photoreceptor cells that are part of the human's eye retina. They are also known as cones and provide all the sensations we perceive as colors. There are three types of cones, i.e. short(S), medium (M) and long (L) cones, commonly referred to as blue, green and red cells respectively. The S, M, and L cones have a peak spectral sensitivity at 440, 540, and 560 nm respectively. When light enters the eye, photosensitive pigments are activated and the brain assembles the information leading to a perception of color. In case of normal human color vision, all S, M and L cones are present and fully functional. All colors can be observed when the combined signal from the three cones is analyzed by the brain. Normal human color vision is trichromatic. Anomalous trichromacy appears when all three cones work, but one is less functional than the others. In case one of the three cones is completely nonfunctional, the colorblindness is called dichromacy. Both anomalous trichromacy and dichromacy can be divided into three subtypes respectively, related to red, green or blue deficiency or non-functionality respectively. The rarest forms of CVD are when only one cone is working or there is no cone function at all. In this case is referred to monochromacy and achromacy.

Until today, no real cure or medicine exists for the disorder, however, solutions are provided in assisting, aiding or supporting patients. Products and methods have been developed to enhance the color perception of people suffering from the CVD disorder. Amongst those, ophthalmic wearables or coated glasses are probably the most widely used. However, their popularity, studies show that such glasses still do not provide a normal color vision experience. While altering the vision in a global sense, they lack overall contrast improvement. Further, there is never an instant adaptation for the eye, so only after some time, e.g., half an hour, such wearables can be experienced as a real-time application for the viewer. Moreover, they are used for all types of CVD although being designed to block specific wavelengths, which should be different for every CVD type. Alternatively, optoelectronic glasses could be configured as more customizable, but can be rather uncomfortable and tiring as wearable. Although the availability of features in smartphones and computers may suggest a rather accurate adaptation, they are often not visualizing (due to lack of calibration and/or sensor equipment) the correct colors as should. Examples of display applications to rectify images for a certain type and/or degree of colorblindness, are for instance given in "An Approach Towards Vision Correction Display and Color blindness" from Mohammed Ammar et al, and "Image Processing With Color Compensation Using LCD Display for Color Vision Deficiency" from You Je In et al. However, according to the art, in the matrix calculations for correcting or adapting images, only RGB and possibly also the brightness (Y) is used, whereas never is referred to the use of the superior XYZ color space.

Apart from the above, stand-alone color sensors exist and may detect the color of a surface being scanned. For example, in US2006139644 a hand-held colorimetric device is described, suitable for use by blind or color-blind individuals to determine the color of a surface-under-test (SUT), e.g., of a fabric. The device has an aperture which, in use, is covered by the SUT whose color is to be determined. Multiple color LEDs (in pairs) illuminate the SUT and diffuse reflections therefrom used to determine the luminous reflectivity and chromaticity values for the color of the SUT. The measured values are compared with colorimetric values of reference surfaces to determine the color of the SUT. The colorimetric device may output the name of the color aurally. Further, US2002159066 relates to a handheld, pen-like colorimeter for measuring the color of an object, comprising several light emitters (LEDs and/or lasers), each with distinct color spectra. The emission of each color is modulated at a specific frequency. A light sensor samples the light that is reflected from an object illuminated by the light emitters. A microprocessor computes the Fourier transform of the intensity of the reflected light over time. The modulation frequency of the light emitters is adjusted to account for the artificial, ambient light. A color value based on the Fourier transform of the reflected light is calculated and a color name is presented to the user accordingly. The prior-art refers to a certain calculation for determining the color, for which reference is made to either RGB values or use of the YUV (or LUV) color space respectively. However, performing calculations in the superior XYZ color space, for determining the color of the scanned surface (or object), is nowhere found in the art.

As is known from the art, there is an important difference between RGB and YUV on the one hand and XYZ on the other hand concerning device dependency, non-linearities and limitations in color range. While the use of XYZ values in the XYZ color space can be mapped to a complete standardized color space, RGB is a non-standardized subset of the standard color space, and as such will introduce inaccuracies into the latter. While RGB can be practical for editing and visual applications, its lack of standardization and mapping to human vision/eye makes it less reliable for accurate color measurement. YUV improves on RGB for certain tasks by separating luminance and chrominance, but it does not match the superiority of XYZ. XYZ, rooted in human perception and standardized by the CIE, is best suited for accurate and consistent color measurement. CIE XYZ is a universal, device-independent standard designed explicitly to model human vision, and is designed to provide superior accuracy and completeness in color science and measurement.

The prior-art on colorimeters for colorblind people, as well as the known art for correcting display images for people suffering from CVD, fails in referring to or using XYZ values and sticks to less accurate values and limitations, resulting in inferior and inconsistent existing solutions for either measuring or else correcting colors to help people with colorblindness.

A simple and practical solution for assisting accurately and consistently CVD patients of any type, is still missing on the market.

SUMMARY OF THE INVENTION

An object of the invention is to provide a real-time and compact standalone solution to help colorblind people in distinguishing and interpreting colors as non-colorblind people would see. This solution may comprise a device and corresponding method.

In a first aspect of the invention, a device is provided, comprising a color sensor for sensing a color of a surface being scanned by the color sensor, wherein the color sensor comprises one or more color sensing elements that obtain and provide sensed information. According to an embodiment, the color sensor may also comprise a light source, or in other words, the device could have an internal light source. In case there is no internal light source, an external light source could also be provided for delivering sufficient light when the color is scanned. The light (e.g., daylight) from the environment may not be enough to sense or measure color information (e.g., capture color values), and therefore a light source (either internal or external), or sufficient light in general, may be used to scan the color. The surface of which a color is sensed or scanned, could be any possible surface, i.e. for example, the surface of an object made of any kind of material that can be brought close or in contact with the device's color sensor.

According to a particular embodiment, the surface could be of a (projector) screen or a (light source) display of which the colors could be scanned in order to be interpreted correctly, for example, by a colorblind person, i.e., a person having a color vision deficiency. For example, in case of the surface of a display comprising a plurality of pixels, such colors are, e.g., represented or emitted by the plurality of pixels of the display. It is herewith noted that, possibly, with the device, or in particular by means of the color indicating and color correcting method thereof, in accordance with an embodiment of the invention, the colors, e.g., emitted by display pixels, can also be corrected for this colorblind person, and this in particular real-time on, e.g., the display.

The device also comprises a processor for determining the color of the scanned surface, wherein the determining is based on the sensed information. The processor may comprise a memory, which could be a non-volatile memory wherein adaptable settings and/or a lookup table is stored. Preferably, the processor is functioning real-time for determining the color of the scanned surface.

The device further comprises a communication means, or what may be termed a communicator, for providing a description of the color of the scanned surface (to the external world, i.e., for example, to a user of the device), wherein the description is based on the determining of the color. Such description could be, for example, the name of the color according to a known standard. Moreover, the description (e.g., the name of the color) could be provided, for example, in the form of audio via a loudspeaker or text via a display. Both loudspeaker or display could be either incorporated in the device, or could be provided externally. In case of, for example, an external loudspeaker or an external display, the communication means is literally a tool or part of the device for communicating i.e. transferring or transmitting the description to such external loudspeaker or such an external display respectively, again, for example, emitting or representing the name. In case a loudspeaker or a display is incorporated in the device, the communication means could be interpreted as such loudspeaker or such display respectively. The internal loudspeaker or the internal display then directly provide the description, e.g., bringing out the name via automated speech or text respectively. According to an embodiment, the communication means is a display (comprised in the device) for displaying the description of the color of the scanned surface, and the description comprises, for example, at least a name. In addition, the display may comprise a user interface comprising selection options and/or buttons. The device may further comprise a power supply such as an energy storage module or a battery, herewith itself providing in energy or power for being operational, or, in other words, for enabling standalone operation. The device may further comprise a temperature sensor and/or movement sensor or a gyroscope. The device may further comprise energy harvesting elements, such as, for example, photovoltaic cells.

In a second aspect of the invention, a method is provided for indicating a color of a surface by a device in accordance with the first aspect. The method comprises the steps of (i) powering the device, (ii) bringing the color sensor of the device in ON-status, (iii) bringing the color sensor close to or onto a surface to be scanned of which a color should be sensed or scanned by the color sensor, (iv) scanning the surface to be scanned with the color sensor, and herewith sensing the color thereof to be sensed, (v) providing sensed information of the color of the scanned surface to the processor, (vi) determining by the processor the color of the scanned surface based on this sensed information, and (vii) providing a description of the color of the scanned surface. The powering of the device could be enabled by a power supply comprised in the device, wherein the power supply being, for example, an energy storage module or a battery. The determining of the color of the scanned surface by the processor may be performed in real-time. The providing of a description of the color of the scanned surface could be enabled by a display (comprised in the device) for displaying such description. The bringing of the color sensor in ON-status may be enabled by movement of the color sensor being detected by a movement sensor or a gyroscope.

In a third aspect of the invention, a method is provided for correcting a color of a surface for a color vision deficiency (of a colorblind person) by use of a device in accordance with the first aspect. The method comprises the steps of (i) indicating the color of the surface in accordance with the second aspect, (ii) receiving (via the communication means) or determining (by the processor) the color vision deficiency, (iii) determining by the processor a correction of the color to be applied for the color vision deficiency (of the colorblind person) such that the correction of the color for the color vision deficiency (of the colorblind person) corresponds closely to a real-life and (almost) true version of the color in case of no color vision deficiency (of a non-colorblind person), (iv) applying the correction of the color (for the colorblind person), and (v) providing the correction of the color via the communication means. It is noted that the word 'closely' is used, because it might happen (for some cases or examples of color vision deficiency) that it is difficult to achieving the perfect match or correspondence with reality, although we can get very close, or substantially close such that an appropriate interpretation of the color is possible or feasible (with no misunderstanding). The determining of a correction of the color to be applied for the color vision deficiency (of the colorblind person) is, for example, based on mathematical formula, in particular, for example, matrix calculations with XYZ and/or LMS color space values are used.

According to further aspect of the invention, a method is provided for correcting a color of a surface for a color vision deficiency by use of a device, the device comprising: a color sensor for sensing a color of a surface being scanned by the color sensor, having a sensitivity curve, and the color sensor comprising one or more color sensing elements providing sensed information, a processor for determining the color of the scanned surface, wherein the determining being based on the sensed information, and being further based on calculations in XYZ color space, and a communication means for providing a description of the color of the scanned surface. The method comprises the step of (i) indicating the color of the surface in accordance with a method comprising the steps of (a) powering the device, (b) bringing the color sensor of the device in ON-status, (c) bringing the color sensor close to or onto a surface to be scanned of which a color should be sensed by the color sensor, (d) scanning the surface to be scanned with the color sensor, and herewith sensing the color thereof to be sensed, (e) providing sensed information of the color of the scanned surface to the processor, (f) determining by the processor the color of the scanned surface based on the sensed information, and further being based on calculations in XYZ color space, and (g) providing a description of the color of the scanned surface. The method further comprises the steps of (ii) receiving (via the communication means) or determining (by the processor) the color vision deficiency, (iii) determining by the processor a correction of the color to be applied for the color vision deficiency such that the correction of the color for the color vision deficiency closely corresponds to a real-life and (almost) true version of the color in case of no color vision deficiency, wherein the correction being based on calculations in XYZ color space, (iv) applying the correction of the color, and (v) providing the correction of the color via the communication means (being or comprising a display).

According to an embodiment, the determining a correction of the color to be applied for the color vision deficiency is based on mathematical formula, in particular matrix calculations with XYZ and/or LMS color space values.

According to an embodiment, the color sensor of the device being used, comprises a light source having an emission spectrum, and bringing the color sensor of the device in ON-status implies that the light source is activated.

According to an embodiment, the emission spectrum of the light source, together with the sensed information and the sensitivity curve of the color sensor, allow for calculations of XYZ values for the color of the scanned surface.

According to an embodiment, the processor of the device being used, is functioning real-time (e.g., for determining a color being scanned but also for correcting a color), and determining by the processor a correction of the color to be applied for the color vision deficiency is performed real-time. Hence, instant indication and correction of colors can be provided.

According to an embodiment, the communication means of the device being used, is used for receiving the color vision deficiency and/or is a display. The display may comprise a user interface comprising selection options and/or buttons.

According to an embodiment, the device being used further comprises a power supply such as an energy storage module or a battery, and operating the device for performing the correcting method is enabled stand-alone. It is herewith noted that the method for indicating the color of the surface hence can also be enabled stand-alone, and the device being used can thus be interpreted as a stand-alone operating device.

According to an embodiment, the device being used further comprises energy harvesting elements, such as, for example, photovoltaic cells, and operating the device for performing the correcting method is further enabled stand-alone. It is herewith noted that the method for indicating the color of the surface hence can also be further enabled stand-alone, and the device being used can thus be further interpreted as a stand-alone operating device.

According to an embodiment, the processor of the device being used, is capable of storing information such as adaptable settings and/or a lookup table and/or the (indication or determination of a) color and the correction thereof.

According to an embodiment, the device being used further comprises a temperature sensor and/or movement sensor or a gyroscope, and applying the correcting method is taking into account temperature and/or movement sensitivities.

In a fourth aspect of the invention, a method is provided for—preferably real-time—correction of a color of a display comprising a plurality of pixels (wherein the plurality of pixels are emitting colors, and one or more of the plurality of pixels are emitting the color), that is viewed at by a colorblind person i.e. a person having a color vision deficiency. The method comprises the steps of (i) retrieving the original color value in XYZ color space, e.g. RGB given in XYZ (for each of the RGB colors i.e. for Red (R), Green (G) and Blue (B) respectively) or XYZ, of the color for any of the plurality of pixels of the display emitting the color, (ii) receiving or determining the color vision deficiency (of the colorblind person), (iii) determining—preferably real-time—the correction of the color to be applied for the color vision deficiency (of the colorblind person viewing the display), e.g., wherein the correction of the color is based on the original color value and the color vision deficiency (of the colorblind person) wherein the correction being based on calculations in XYZ color space, (iii) applying the correction of the color (to one or more values of one or more pixels to be displayed) (for the colorblind person), and (iv) displaying for any of the plurality of pixels emitting the color, the correction of the color i.e. its corrected color. It is noted that the method of the fourth aspect could be applied for any color that needs to be corrected for the colorblind person having a color vision deficiency, in order to have a better color representation corresponding (more) to reality. Whenever all colors are corrected, the colorblind person will see or view the display with corrected colors corresponding closely to a real-life and (almost) true version of what is seen or viewed by a non-colorblind person having no color vision deficiency. It is particularly noted that the method of the fourth aspect doesn't refer to the device in accordance with the first aspect, but however is a variant of the method described by the third aspect without the use of the device (of the first aspect). In other words, the method in accordance with the fourth aspect could be directly embedded in or provided for the display of which the colors could be corrected for a colorblind person. According to an embodiment, the display is herewith then configured or designed to take over (part of) the functionalities of the device that are needed to perform the method of the fourth aspect.

In a fifth aspect of the invention, a display is provided comprising a plurality of pixels, a processor and a memory (all, some, or not comprised in the processor). One or more of the plurality of pixels are emitting a color. The processor is intended for calculating—preferably real-time—for one or more of the plurality of pixels emitting the color, a correction of the color to be applied for a color vision deficiency, e.g., using the method of the fourth aspect, such that the correction of the color for the color vision deficiency corresponds closely to a real-life and (almost) true version of the color in case of no color vision deficiency. The memory is meant for storing one or more factors or characteristics related to the color vision deficiency, such as, e.g., L'M'S' (or one of the deficiencies L', M' and/or S') of a colorblind person as compared to LMS of a non-colorblind person. The processor is receiving and interpreting the one or more factors and is converting these to—preferably real-time—computing values to be applied. According to an embodiment, the display of the fifth aspect is considered for the method of the fourth aspect, for—preferably real-time—correction of a color of such display that is viewed at by a colorblind person i.e. a person having a color vision deficiency.

This disclosure provides various aspects, examples, embodiments, and features which, unless expressly stated or which would be mutually exclusive, should be understood to be combinable with other aspects, examples, embodiments, or features (or parts thereof) described herein.

DETAILED DESCRIPTION OF THE INVENTION

Figure 1:
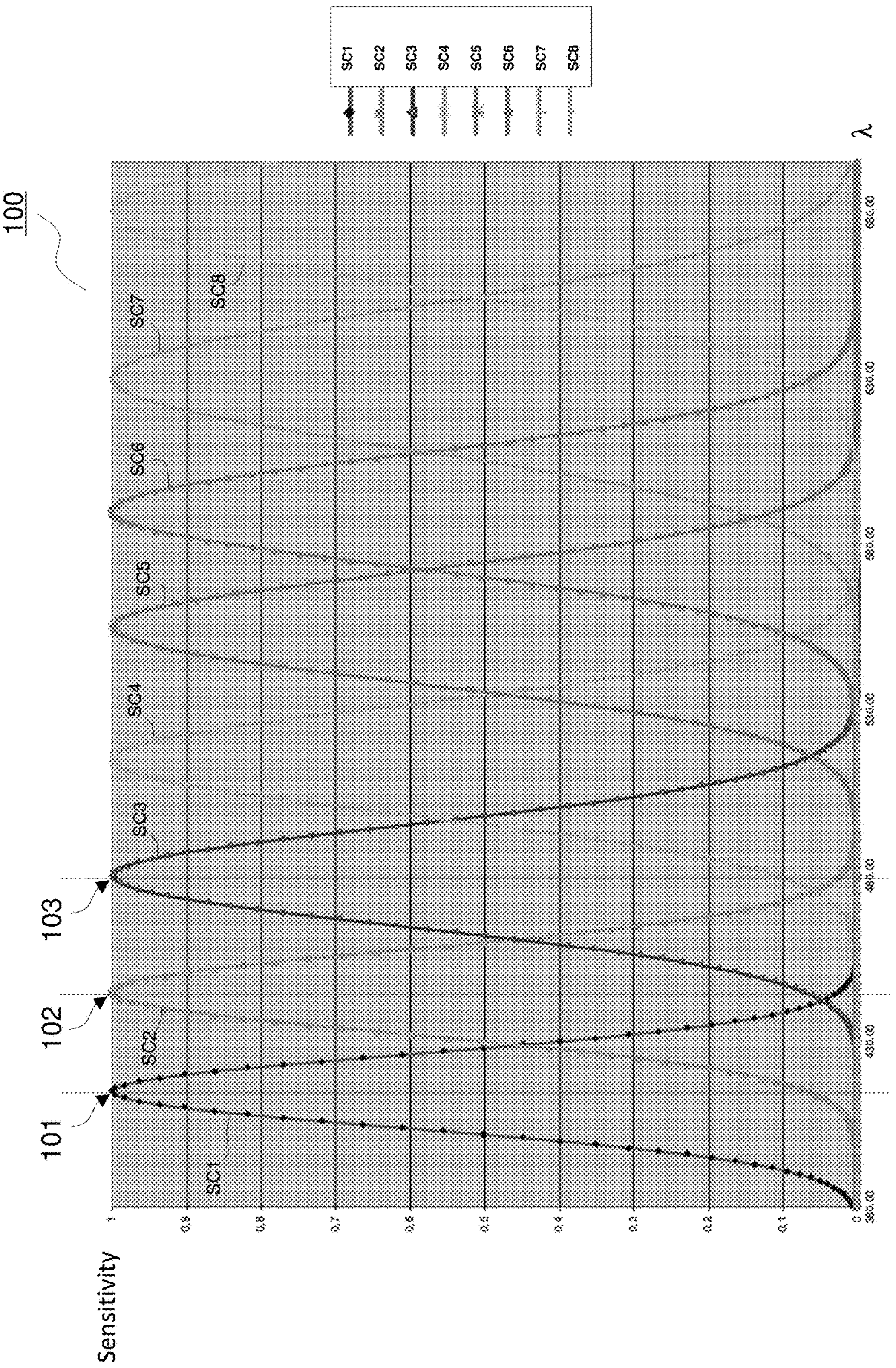
FIG. 1 shows a graphical embodiment of the peak sensitivity curves of a plurality of color sensing elements comprised in the color sensor, in accordance with the invention.

The invention relates to a color indication and/or color correction device which may comprise the following components: a color sensor, a processor, a display and a power supply. According to an embodiment, the device can operate real-time and is capable for standalone operation by having all its components integrated in one single device, and being operable this way. Moreover, this integration is preferably performed in a compact manner such that a compact standalone device is proposed. The color indication provided with the device is preferably given in real-time, meaning that whenever an indication of a color is requested, an immediate or direct response is delivered. In other words, preferably there is no delay in providing the color indication. The color sensor is intended for sensing a color of a surface being scanned by the color sensor, wherein the color sensor comprises one or more color sensing elements and further may comprise a light source (such as a LED). In case the device doesn't comprise a light source, then normally an external light source will be present for having sufficient light, herewith enabling measurements, and thus allowing calculations of the sensed color information. The processor is a computing element meant for determining (i.e., for example, calculating and/or estimating) the color of the scanned surface, preferably real-time. The processor may comprise a memory such as a non-volatile memory, wherein, for example, settings of a colorblind person could be stored. The power supply can be a battery or another type of energy storage module. In case of a battery, it may be a rechargeable battery. The battery could be a Li-ion battery. The display can be a light-emitting (e.g., LED, OLED) or reflective (e.g., LCD) display for displaying a description of the color of the scanned surface. Such description comprises, for example, at least a name. Moreover, the integrated display in the device may also display color space coordinates of the color being scanned, such as, for example, xy values of the CIE chromaticity diagram (xy representing the chromaticity of the color) and the brightness Y (also called the luminance of the color), when converted to and hence using the CIE xyY color space. Alternatively, XYZ values could also be displayed when using the XYZ color space instead. It is noted that, for processing purposes, XYZ values are generally preferred, whereas the calculations and/or computations are linear for such XYZ values. XYZ values are depending on the brightness, and hence (by default) linear for matrix calculations. Instead, xy of the xyY values are not depending on the brightness (i.e. Y being divided away), and hence non-linear calculations will be observed. The xyY values (in particular xy thereof) are although interesting for representation in the CIE chromaticity diagram, as mentioned above.

Using XYZ values in the XYZ color space can be mapped to a complete standardized color space. As mentioned earlier, XYZ, rooted in human perception and standardized by the CIE, is best suited for accurate and consistent color measurement. CIE XYZ is a universal, device-independent standard designed explicitly to model human vision, and is designed to provide superior accuracy and completeness in color science and measurement. XYZ is thus preferably used, in addition to the motivation regarding linearity aspects referred to above. Further, it is herewith noted again that the art is not relying on this accurate approach of using XYZ values, and therefore is missing crucial information from the spectral theory and colorimetry.

The real-time color indication device in accordance with an embodiment of the invention, is a compact standalone aid for people suffering from color vision deficiency, in that any color of a surface being scanned can be described by its name, and hence can be interpreted. The real-time indication of color could be displayed via a display provided with or onto the device, or alternatively it could be communicated as automated speech or audio via a loudspeaker provided with or onto the device. The working principle of the color indication device is now further described.

For each of the one or more color sensing elements of the color sensor, a value can be measured corresponding to the color of the scanned surface. The one or more sensing element values, together with the sensitivity curve of the color sensor (and of the one or more color sensing elements) and the emission spectrum of the light source (e.g., comprised in the color sensor), allow for the calculation of XYZ values for the color of the scanned surface. Such XYZ values can then be converted to CIE Lab color space (L (a, b)). The calculation and following conversion can be performed by the processor. Such calculation is, for example, performed according to a first theoretical spectral manner. It is noted that, in case the device or its color sensor in particular doesn't comprise a light source, then normally an external light source will be present in order to properly scan the color and herewith have an emission spectrum of such external light source, which can be used as reference for allowing calculations of the color values being scanned.

The device may comprise XYZ values for all possible colors (e.g., RAL colors) having a name, which are, for example, stored in a table. Such XYZ values can again be converted to CIE Lab color space ($L_i$ ($a_i$, $b_i$) with i=1 . . . n for n colors). The conversion can be performed by the processor. The table with XYZ values for all colors, or their corresponding Lab values $L_i$ ($a_i$, $b_i$), can be stored in the non-volatile memory of the processor. The non-volatile memory may comprise a lookup table (LUT), defined as an array of data that maps input values to output values, thereby approximating a mathematical function. Given a set of input values (e.g., XYZ values), a lookup operation may retrieve the corresponding output values (e.g., Lab values) from the table.

For all n colors, the processor can then calculate a color difference ΔE defined as $$\Delta E_i = \sqrt{(a-a_i)^2 - (b-b_i)^2 - (L-L_i)^2} \text{ for } i = 1 \ldots n$$

It is noted that in case ΔE<2 there is almost no color difference visible, whereas in case ΔE>2 there is for sure a color difference visible.

All color differences $\Delta E_i$ can be compared and for the smallest ΔE, the closest correspondence with the color of the scanned surface may be found. Or, in other words, the color of the scanned surface can be determined as the color s with Lab value $L_s$ ($a_s$, $b_s$), for which $\Delta E_s$ is the smallest amongst all. For this $L_s$ ($a_s$, $b_s$), a corresponding XYZ value can be converted, and a corresponding name can be given or associated. This name can be displayed on the display, being the name of the color of the scanned surface.

In addition to this first theoretical spectral manner, an alternative, second manner to determine XYZ values can be proposed based on matrix calculations. As yet mentioned above, the device may comprise XYZ values for all possible colors (e.g., RAL colors) having a name, which are stored in a table. For each color, the following equation for corresponding XYZ value can be written:

$$\begin{bmatrix} X \\ Y \\ Z \end{bmatrix} = \begin{bmatrix} m_{11} & & m_{1k} \\ m_{21} & & m_{2k} \\ m_{31} & & m_{3k} \end{bmatrix} \times \begin{bmatrix} v_1 \\ \\ \\ \\ v_k \end{bmatrix}$$

Wherein k is the number of color sensing elements of the color sensor comprised in the device. It is herewith recalled that for each of color sensing elements a value ($v_j$ wherein j=1 . . . k) can be measured corresponding to the color of the scanned surface. Further, it is noted that $$\begin{bmatrix} X \\ Y \\ Z \end{bmatrix}$$

is a 3×1 matrix, $$\begin{bmatrix} m_{11} & & m_{1k} \\ m_{21} & & m_{2k} \\ m_{31} & & m_{3k} \end{bmatrix}$$

is a 3×k matrix, and $$\begin{bmatrix} v_1 \\ \vdots \\ v_k \end{bmatrix}$$

is a k×1 matrix.

Moreover, the 3×k matrix is also referred to as the correction matrix $M_{corr}$.

Consider, for example, the situation wherein we have 8 sensing elements provided in the sensor. In this case k=8, and for the correction matrix $M_{corr}$ we have 3×8=24 unknowns. We can now select 24 colors that are, for example, stored with a name in the table. Preferably, these colors are sufficiently distinctive from each other. For one of such colors we can have:

$$\begin{bmatrix} X \\ Y \\ Z \end{bmatrix} = M_{corr} \times \begin{bmatrix} v_1 \\ v_2 \\ v_3 \\ v_4 \\ v_5 \\ v_6 \\ v_7 \\ v_8 \end{bmatrix}$$

Or else, for all 24 colors we can define: $T=M_{corr}\times S$, wherein T is a 3×24 matrix and is called the target matrix, and S is a 8×24 matrix and is called the sensor matrix. The target matrix T can also be written as:

$$T = T \times S_T \times [S \times S_T]^{-1} \times S$$

And hence, the correction matrix $M_{corr}$ can be defined as:

$$M_{corr} = T \times S_T \times [S \times S_T]^{-1}$$

With this correction matrix $M_{corr}$, and with the sensing element values v1 . . . v8 that can be measured with the sensor (here comprising 8 sensing elements) for any color (of a surface) being scanned, the sensed or scanned color i.e. in particular the XYZ value thereof, can now be determined:

$$\begin{bmatrix} X \\ Y \\ Z \end{bmatrix} = M_{corr} \times \begin{bmatrix} v_1 \\ v_2 \\ v_3 \\ v_4 \\ v_5 \\ v_6 \\ v_7 \\ v_8 \end{bmatrix}$$

For the XYZ value determined (for the scanned color), again, a corresponding name can be given or associated. Either, the XYZ value and corresponding name can be found directly in the list or table of colors stored in the device, e.g., in the non-volatile memory of the processor. Or else, the name (of the scanned color) can be deducted by means of the smallest color difference ΔE with a known XYZ value and corresponding name from the stored list. The name of the scanned color can be displayed on the display.

In addition to the name of the scanned color, i.e. the color of a surface being scanned, the display can also display XYZ value or derived xyY coordinates, anyhow the XYZ value and corresponding name being determined (i.e. either through the first theoretical spectral manner, or else, by using second manner with matrix calculations). The color itself (that is scanned) may also be displayed on the display, although this may have less added value for a colorblind person.

According to an embodiment, the display can further display a color being different from the color of the scanned surface, though being interpreted as such, i.e. as the real color of the scanned surface, by a person having color vision deficiency. In order to do so, for example, a higher saturation is applied to the color to be displayed (e.g., in the XYZ or Lab values), such that a more correct interpretation (by the colorblind person) of the color of the scanned surface can take place. One may create a sequence via test patterns to find out for someone who is colorblind where the sensitivity ends between colors. Based on this sensitivity limitation, the amount of correction can be determined, meaning the amount of tuning or adaption needed for the colors such that the colorblind person can still see, for example, a red surface as being red, a green surface as being green, a blue surface as being blue etc. In other words, this tuning or adaptation is performed such that a corrected color is presented which can be interpreted or seen by the colorblind person as the true and exact color of the surface being scanned. Such tuning or adaptation could be done, e.g., by applying a higher saturation and thus augmenting, for example, one or more of the XYZ values (or other color space values). According to an embodiment of the invention, the corrected color for the colorblind person is depicted in real-time on the display integrated in the device.

Consider, for example, again the matrix representation of XYZ values for a color being sensed or scanned. The correction needed can be based on the theory of correction factors (or weight factors) as defined, e.g., in earlier patent application US2023282153 of the same Applicant (also referred to as "Subdelta" application by the Applicant). A flow can be proposed for the determination of the corrected color X'Y'Z' for the scanned color XYZ based on the factor $f_1$, $f_2$ calculations and the matrices $M_1$, $M_2$ applied on the scanned color XYZ values.

$$\begin{bmatrix} X' \\ Y' \\ Z' \end{bmatrix} = Mfinal \times \begin{bmatrix} X \\ Y \\ Z \end{bmatrix}$$

Hence, according to an embodiment, the final matrix Mfinal for applying the correction can be defined by these 2 matrices and their weight defined by the factors $f_1$, $f_2$. Thus, by means of example, we can have $$Mfinal = f_1 \times M_1 + f_2 \times M_2 \text{ wherein } f_1 + f_2 = 1.$$

Hence, in this case, the final matrix Mfinal is determined by 2 types of correction, applied via the matrices $M_1$, $M_2$.

According to an embodiment, one of the corrections (e.g., $M_1$) is more important to consider than the other. As a result, one of the weight factors (e.g., $f_1$) could be significantly larger than the other, for example, representing 80% (or 0.8).

The correction presented above by 2 matrices and corresponding 2 weight factors, could be extended to the use of even more matrices and their corresponding weight. For example, in case of 3 types of correction needed for the final matrix Mfinal, and thus 3 matrices involved, we could have $$Mfinal = f_1 \times M_1 + f_2 \times M_2 + f_3 \times M_3 \text{ wherein } f_1 + f_2 + f_3 = 1.$$

According to an embodiment of the invention, the real-time color indication device for aiding people that are suffering from color vision deficiency or colorblindness, is not only depicting the name of any color of a surface being scanned, but is also capable of displaying the corrected color for such people which can be interpreted or seen by them as the true and exact color of the surface being scanned. Hence, according to an embodiment, the real-time color indication device to assist colorblind people is also a real-time color correction device for displaying corrected colors to colorblind people, i.e. for showing the colors that are scanned as if these people would not be colorblind.

Although the device may be capable for standalone operating, for example, by having a display onto which the color indication can be directly shown, even in real-time, it is also possible to connect the device either wired (e.g., HDMI cable) or wireless (e.g., Bluetooth) with an external device or system, for example, for further visualization purposes. According to an embodiment, an USB connection is provided onto the device, for connecting the device, for example, with a phone, a tablet, a laptop or any other communication and/or computing device. According to an embodiment, the device is connected with an external display, such as, for example, a TV-screen, computer monitor or LED-wall. Hence, such external display may immediately display the (desired) color as measured from a scanned surface (considered that the external display is calibrated appropriately). According to an embodiment, the device is connected with an external lighting device, such as, for example, a lamp, in particular a Philips Hue lamp for white and (variable) colored light. With the device a user interface of the lamp could be eliminated, whereas only a paper or pallet of colors is needed, of which each of the pallet colors can be scanned by the device, and subsequently this scanned color (i.e. color characteristics thereof) can be transmitted to the lamp as the desired color to be emitted thereby.

The color sensor of the—possibly real-time—color indication device, comprising one or more color sensing elements, can be temperature dependent. Either in the determination of the sensed or scanned color XYZ values, or in the determination of the corrected color X'Y'Z' values, a compensation may be necessary in case of such temperature dependency of the sensor. By means of applying such compensation, the color of the surface being scanned could be interpreted appropriately by the device, and thus could be depicted with the correct name to a colorblind person. Moreover, the corrected color which can be interpreted or seen by the colorblind person as the true and exact color of the surface being scanned could be displayed properly, for example, via the display of the device. It is herewith noted that, according to an embodiment, the device is not only indicating a color being scanned, but could also correct the color for a colorblind person. Further is noted that, for the comfort of the user or the colorblind person using the device, the corrected color should be communicated instantly or real-time whenever a color is sensed or the color surface is scanned by the color sensor of the device. Such real-time communication or visualization of the corrected color could be displayed via the device's display (if such display is provided), or alternatively it could also be transmitted, for example, to an external display, a camera in a connected headset, to VR/AR glasses, to a projector and/or to television sets being connected, either wired or wireless with the color indicating and in this case also color correcting device.

The color sensor comprising one or more color sensing elements can be non-linear, such that the measurements of the color sensing element values may also require for compensation.

In addition to the color sensor comprising one or more color sensing elements, the device may further comprise a temperature sensor and/or a movement sensor or gyroscope.

The color sensor may comprise a memory, such as, e.g., a non-volatile memory, which could be used, for example, to store calibration values.

As mentioned before, the color sensor comprises one or more color sensing elements, and further may comprise a light source. The light source may comprise one LED or a plurality of LEDs. For example, the light source comprises two LEDs, i.e. a first LED having a first characteristic and a second LED having a second characteristic. For this particular case of two LEDs, the measurement of the color sensing element values could either be done with the two LEDs, or else with only one of them. The use of more LEDs for the color sensor measurement may lead to more accurate values being measured.

In terms of application, the real-time color indication device in accordance with an embodiment of the invention could be used as follows. The real-time color indication device may comprise a color sensor and a display. According to an embodiment, the color sensor is turned on when there is movement detected, i.e. whenever the device is moved, or when a button is pressed bringing the sensor in ON-status. The movement detected, for example, occurs by means of a movement sensor or gyroscope provided in the device. The color sensor of the device is brought close to or into contact with a surface having a color that is desired or requested to be determined. The color sensor is hence scanning the surface for sensing the color that someone, in particular, e.g., a colorblind person, wants to know. During scanning, and thus in real-time, the display of the device displays a description of the color of the scanned surface. Such description comprises, e.g., at least a name for the color, and may further comprise color coordinates and/or a color representation of the measured color, either as true and exact color being sensed, or else as corrected color which can be interpreted or seen by the colorblind person as the true and exact color of the surface being scanned.

DETAILED DESCRIPTION OF THE DRAWINGS

FIG. 1 shows a graphical embodiment of the peak sensitivity curves 100 of a plurality of color sensing elements comprised in the color sensor, in accordance with the invention. Here, by means of example, 8 sensitivity curves SC1, SC2, SC3, SC4, SC5, SC5, SC6, SC7, SC8 are illustrated, corresponding to 8 color sensing elements of the color sensor. The color sensor may comprise a smaller or larger number of color sensing elements than this 8, and hence the color sensor may also comprise 6 or 10 color sensing elements. The curves are representing the color sensitivity for each of the color sensing elements. They are plotted in function of the wavelength λ representing the visible spectrum i.e. from 380 nm to 700 nm. With each wavelength λ in the visible spectrum, a color can be associated, e.g., red at 630 nm for red, green at 532 nm, and blue at 465 nm as are well-known wavelengths in the photonics field. For each of the color sensing elements, a peak (or maximum value) is shown for a particular wavelength λ. This means that the color sensing element is most sensitive (hence the peak) for this particular wavelength λ. For example, as indicated in FIG. 1, a first color sensing element having its peak 101 for its sensitivity curve SC1 at 415 nm, a second color sensing element having its peak 102 for its sensitivity curve SC2 at 445 nm, and a third color sensing element having its peak 103 for its sensitivity curve SC3 at 480 nm. Further, by means of example, the other peaks appear at 515 nm, 555 nm, 590 nm, 630 nm and 680 nm respectively.

Figure 2:
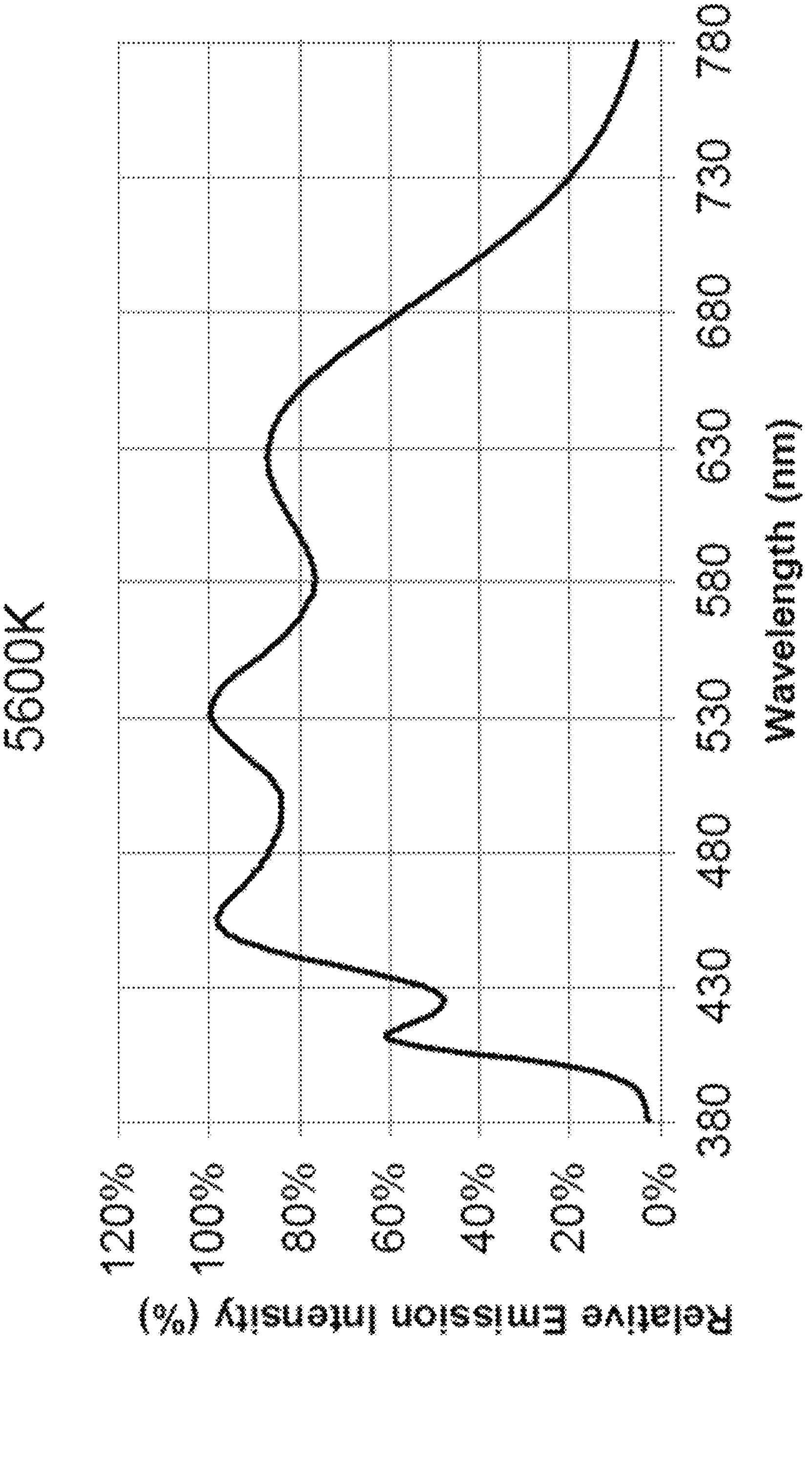
FIG. 2 shows the emission spectrum of the light source which may be comprised in the color sensor, in accordance with an embodiment of the invention.

FIG. 2 shows the emission spectrum of the light source which may be comprised in the color sensor, in accordance with an embodiment of the invention. The light source is, for example, a LED emitting white light at 5600K color temperature. In this graphical representation the relative emission intensity (in %) of the white LED is shown as a function of the wavelength (in nm).

Figure 3:
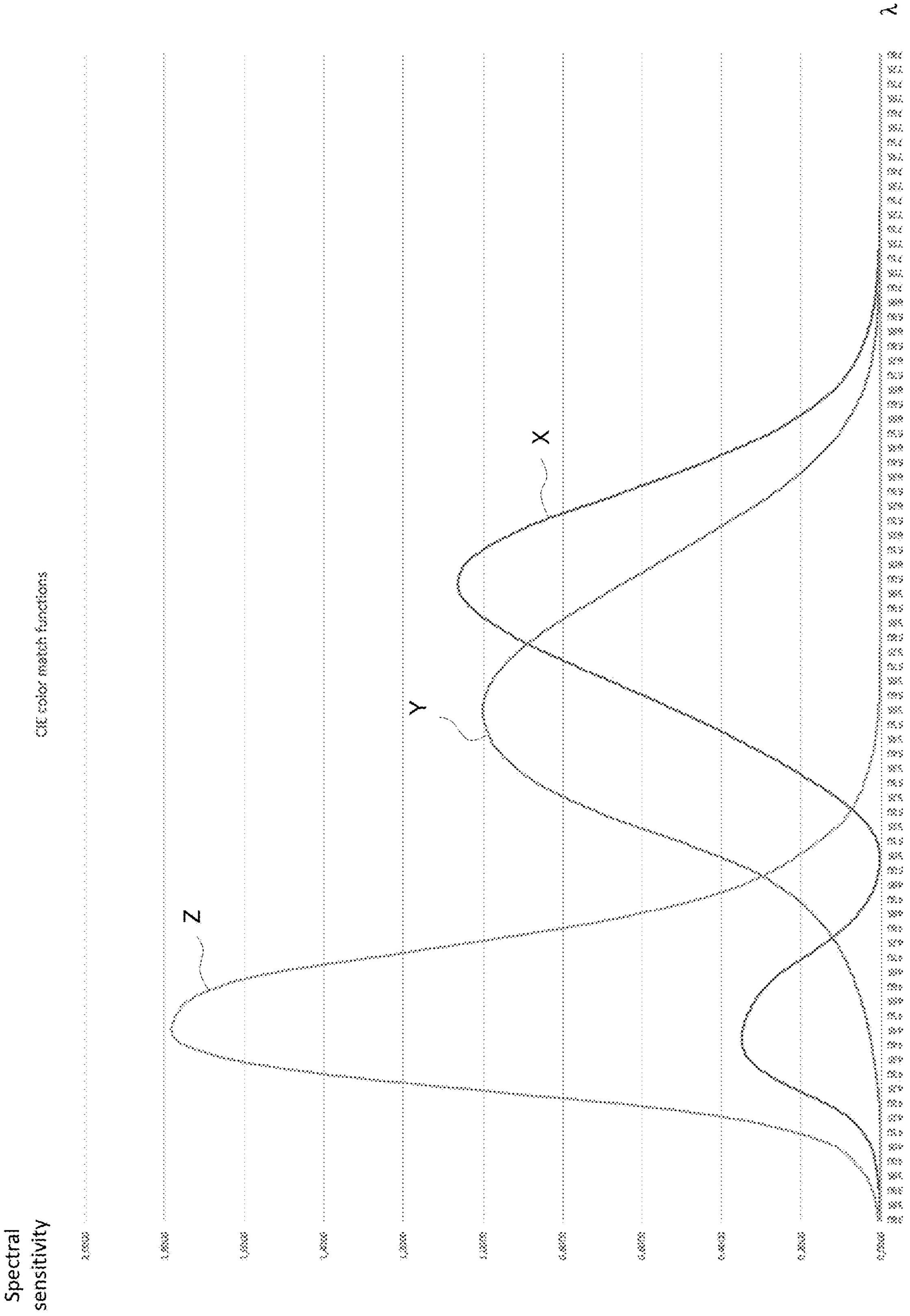
FIG. 3 shows the CIE XYZ standard observer color matching functions.

FIG. 3 shows the CIE XYZ standard observer color matching functions. The CIE color matching functions are defined as the numerical description of the chromatic response of the observer. Due to the distribution of cones in the eye, the tristimulus values (CIE XYZ) depend on the observer's field of view. To eliminate this dependence, the CIE defined a color-mapping function called the standard (colorimetric) observer, to represent an average human chromatic response within a 2° arc inside the fovea of the eye. This 2° angle was chosen owing to the belief that the color-sensitive cones reside within such 2° arc of the fovea. Thus the CIE 1931 Standard Observer function is also known as the CIE 1931 2° Standard Observer. The CIE color matching functions can be thought of as the spectral sensitivity curves of three linear light detectors yielding the CIE tristimulus values X, Y and Z. Collectively, these three functions describe the CIE standard observer. The CIE color matching functions are plotted in function of the wavelength λ representing the visible spectrum i.e. from 380 nm to 700 nm, and beyond until 780 nm. The spectral sensitivity curve for the tristimulus value X has two lobes, i.e. one lobe with a small peak and another lobe having a large peak. The first small lobe has its peak in the blue wavelength range, whereas the second and much larger lobe is peaking towards the area of the red wavelength. The spectral sensitivity curve for the tristimulus value Y is lying around 555 nm being a green wavelength. This is where the average normal sighted human eye is most sensitive, resulting in the fact that green light at this wavelength produces the impression of highest brightness when compared to light at other wavelengths. The spectral sensitivity curve for the tristimulus value Z also has a peak in blue, although being much larger than the one of the tristimulus value X.

Figure 4:
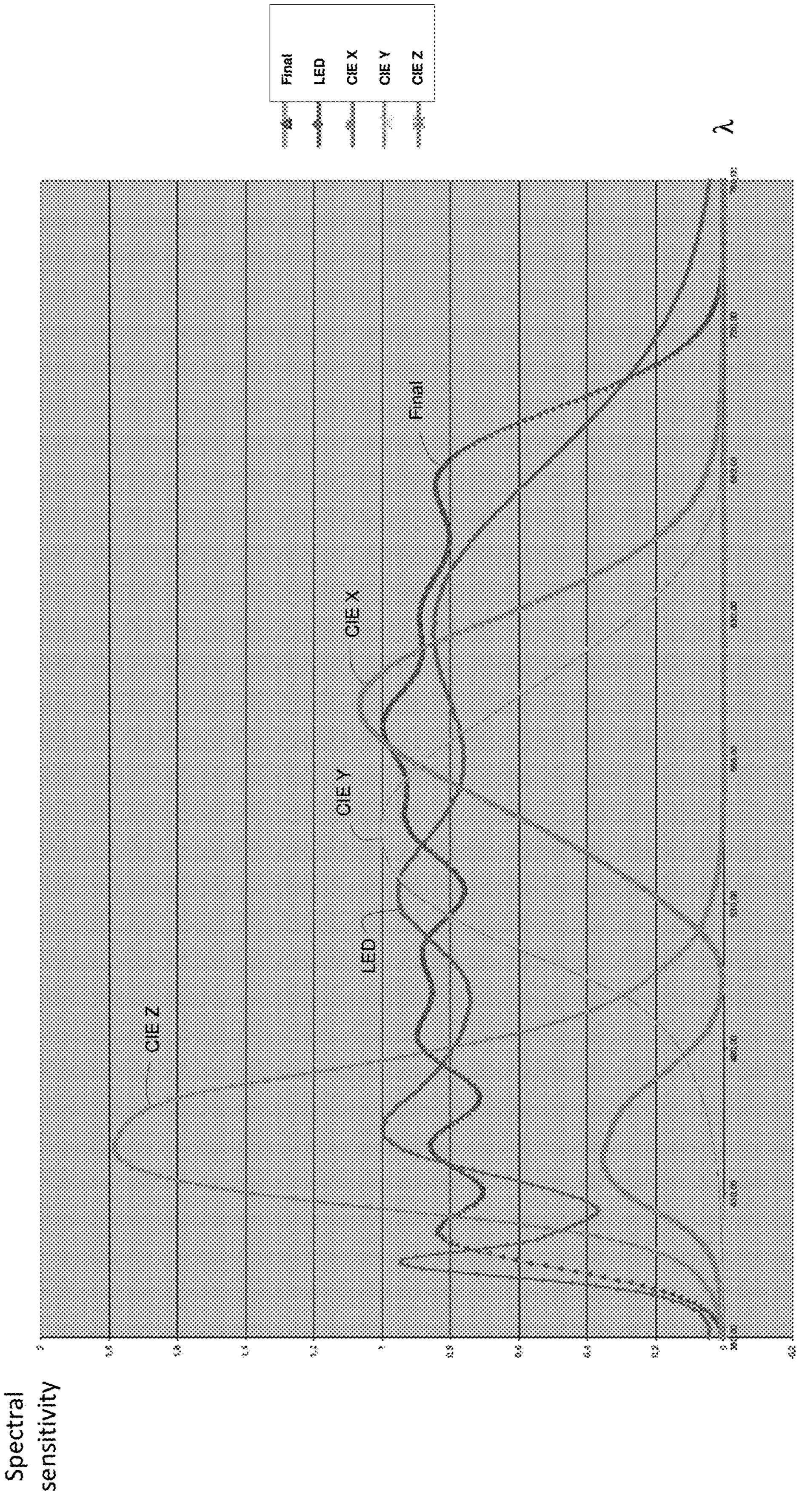
FIG. 4 shows a graphical embodiment in accordance with the invention, wherein multiple curves are represented, illustrating or plotting the spectral sensitivity as a function of the wavelength.

FIG. 4 shows a graphical embodiment in accordance with the invention, wherein multiple curves are represented, plotting the spectral sensitivity as a function of the wavelength λ representing the visible spectrum i.e. from 380 nm to 700 nm, and beyond until 780 nm. The spectral sensitivity curves yielding CIE XYZ (from FIG. 3) are again illustrated, as well as the emission spectrum of the color sensor's LED light source (from FIG. 2). Moreover, indicated as "Final", the sensitivity curve of the color sensor, comprising a plurality of color sensing elements, is also shown here. According to an embodiment, the color sensor comprises 8 color sensing elements, as was for instance also the case for the description of FIG. 1, wherein the peak sensitivity curves for each of the color sensing elements were illustrated. The Final sensitivity curve of the color sensor is defined as the sum of all sensitivity curves $SC_i$ of corresponding color sensing elements. In other words, Final=$\Sigma$ $SC_i$ for i=1 . . . 8 being the number of color sensing elements.

FIG. 4 is particularly relevant when referring again to the calculation of XYZ values for determining the color of a scanned surface according to a first theoretical spectral manner, as described above, taking into account, e.g., the sensitivity curve of the color sensor and the emission spectrum of the (LED) light source which may be comprised in the color sensor. Moreover, it is noted that, when such color sensor's sensitivity curve and such (LED) light source emission spectrum are multiplied, the reflection of the (LED) light source on the color sensor can be determined. In other words, the resulting new spectrum from this multiplication is related to the reflected (LED) light of the (LED) light source.

Figure 5:
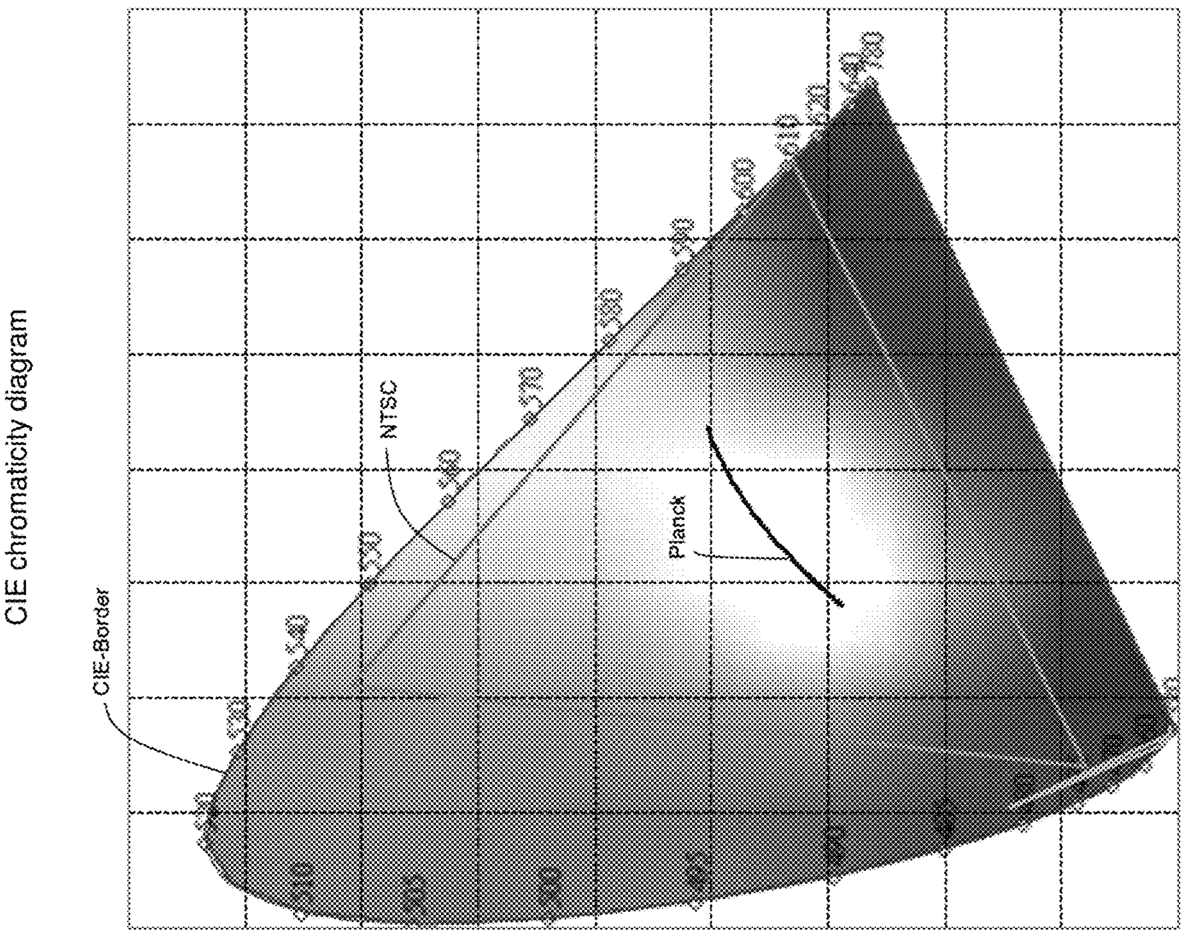
FIG. 5 shows the CIE chromaticity diagram.

FIG. 5 shows the CIE chromaticity diagram, which is a well-known tool to specify how the human eye will experience light with a given spectrum. The diagram represents all chromaticities visible to the average person, also called the gamut of human vision. It cannot specify colors of objects, whereas the chromaticity observed—while looking at an object—depends on the light source as well. The outer curved boundary indicated as "CIE-Border" is called the spectral (or monochromatic) locus, with wavelengths indicated in nanometers. The solid "Planck" curve through the middle, is the Planckian locus, and corresponds to blackbody temperatures. The "NTSC" color gamut, depicted as a triangle and being the standard for analog television, is also shown.

Figure 7:
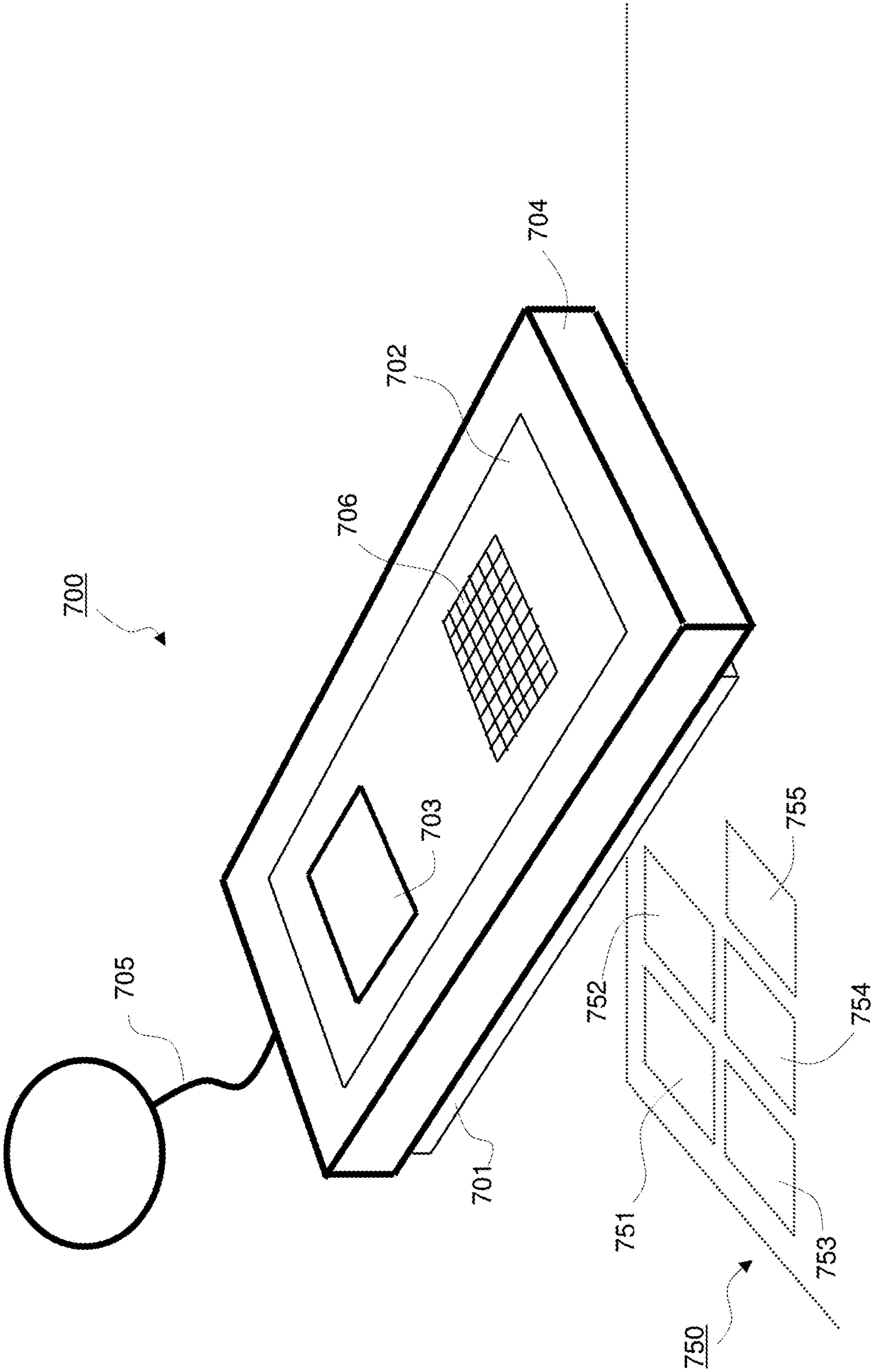
FIG. 7 shows an embodiment of a real-time color indication device, in accordance with the invention.

FIG. 7 shows an embodiment of a real-time color indication device 700 in accordance with the invention. According to this embodiment, the device is designed as a small rectangular box which is portable and is provided with a lanyard 705 for a person, in particular a colorblind person, to wear it, for example, around his/her wrist or neck. Other designs for the device besides this small rectangular configuration are not excluded from the invention. The device 700 is portable, and hence capable for standalone operating. The device 700 comprises a color sensor 701, which is configured for sensing a color 751, 752, 753, 754, 755 of a surface 750 being scanned by the color sensor 701 of the device 700. The color sensor 701 comprises one or more color sensing elements, and may also comprise a light source (here not shown). The device 700 also comprises a processor 702, which is configured for real-time determining of the color 751, 752, 753, 754, 755 of the scanned surface 750. The processor 702 comprises a memory, possibly a non-volatile memory, wherein, for example, settings of a colorblind person could be stored. The non-volatile memory may also comprise one or more lookup tables for storing, for example, XYZ values of colors (e.g., RAL colors) and corresponding Lab values. Such lookup tables may also be used to store calibration values (for example, of the color sensor's light source comprising one or more LEDs). The device 700 further comprises a display 703 for displaying a description of the color 751, 752, 753, 754, 755 of the scanned surface 750. Such description comprises, for example, a name for the color 751, 752, 753, 754, 755, and possibly also other color characteristics, such as, e.g., color coordinates. The display 703 could be a LED display, an OLED display, or an LCD display. On the display 703 one or more buttons and/or a user interface may be provided, by means of which, e.g., selections out of a proposed menu could be made. For example, by means of such menu and buttons, a colorblind person could give input on a series of colors presented to him/her, and herewith the processor 702 of the device 700 could determine which type of colorblindness the person has. The device 700 comprises a power supply 704 such as an energy storage module or a battery. The battery may be a rechargeable battery, and thus a DC/DC converter and USB or USB-c port could be provided for charging purposes and power delivery (and hence not necessarily for communication purposes). The device 700 may also be provided with photovoltaic cells 706, being in connection with the power supply 704, for energy harvesting purposes. The processor 702 may comprise an Analogue-to-Digital Converter (ADC), for example, to measure the battery voltage, in order to indicate to the user (e.g., colorblind person) of the device 700 the battery capacity and hence let the user know when/if the battery needs to be charged.

Figure 8:
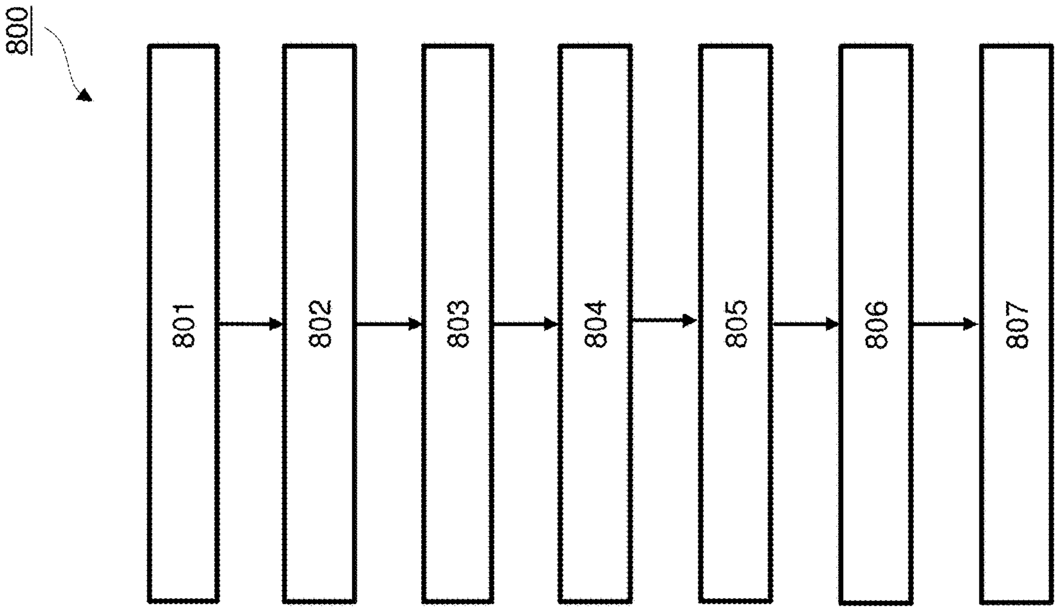
FIG. 8 shows an embodiment of a method to support colorblind people in distinguishing and interpreting colors, by means of using a real-time color indication device, capable for standalone operating, in accordance with the invention.

FIG. 8 shows an embodiment of a method 800 to support colorblind people in distinguishing and interpreting colors, by means of using a real-time color indication device, in particular capable for standalone operating, in accordance with an embodiment of the invention. According to the embodiment here, the method 800 for indicating a color being sensed of a color surface being scanned by the device, in particular by the color sensor thereof, comprises the following steps. In a first step 801, the device is powered, which can be either wired (e.g., connected to the mains) or wireless (e.g., having an internal power supply). The powering of the device could be, for example, by providing a battery (e.g., Li-ion battery) in the device. Step 802 refers to bringing the color sensor of the device in ON-status. A button could be provided on the device directly or, in case the device for example, comprises a display, a touch screen button could be presented. By clicking the button, the color sensor could be brought in ON-status. In step 803, the color sensor is brought or put close to or onto a surface to be scanned of which a color should be sensed by the color sensor. Next, in step 804, the surface to be scanned with the color sensor is scanned, and herewith the color (of that surface) is sensed or scanned. Whenever the color is sensed, sensed information of that color is captured. Step 805 regards to providing sensed information of the color of the scanned surface to the processor. In step 806, the processor can then determine the color of the scanned surface based on the sensed information. Finally, step 807 relates to providing a description of the color of the scanned surface, which could be, for example, by a communication means, e.g., in the form of a display either incorporated in the device or an external screen or projector being connected with the device, or, e.g., in the form of audio produced by a loudspeaker (either internal or external to the device). Such description could be, for example, the name of the color according to a known standard (e.g., RAL colors).

While further elaborating on the method 800 described with FIG. 8, according to an embodiment, the powering of the device in step 801, may be enabled by a power supply comprised in the device, wherein the power supply could be an energy storage module or a battery. According to an embodiment, the determining of the color of the scanned surface by the processor in step 806, could be performed in real-time. According to an embodiment, the providing of a description of the color of the scanned surface in step 807, may be enabled by a display for displaying such description. According to an embodiment, the bringing of the color sensor in ON-status in step 802, could be enabled by movement of the color sensor being detected by a movement sensor or a gyroscope.

Figure 9:
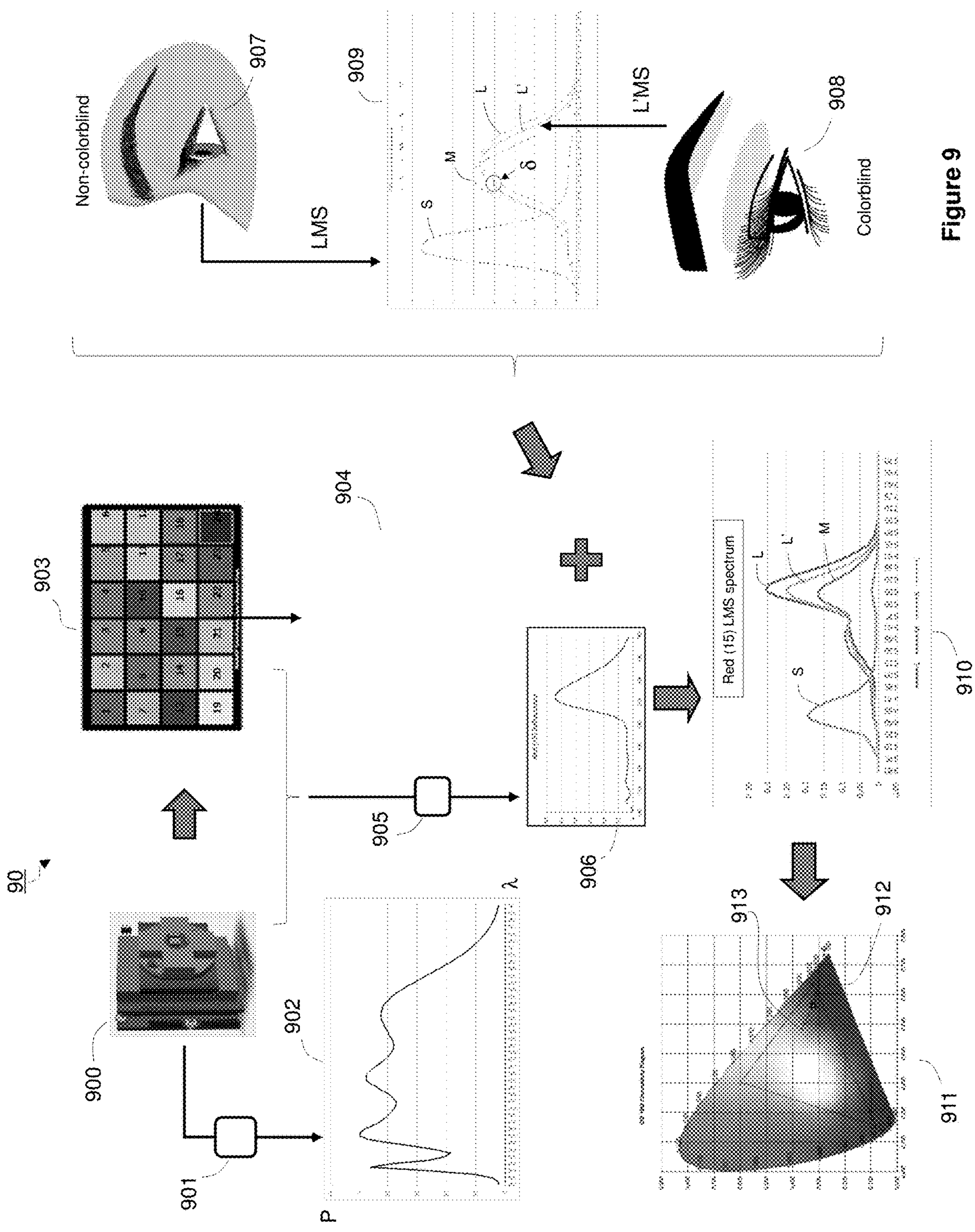
FIG. 9 illustrates schematically an embodiment of a method for defining and correcting deficiency of a colorblind person, which is needed to be applied for this colorblind person such that he/she could see the colors as a non-colorblind person would see, in accordance with the invention.

FIG. 9 illustrates schematically a method 90 in accordance with an embodiment of the invention, for defining and correcting a deficiency of a colorblind person. In other words, the method 90 leads to determining the correction that is needed to be applied to a color spectrum for this colorblind person in order to see colors, here, for example, red as color number 15 from a MacBeth color chart, such as a normal average i.e. non-colorblind person would see. The MacBeth color chart is also known as a ColorChecker Color Rendition Chart, which is a rectangular card comprising a cardboard-framed arrangement of 24 squares of painted samples in a 4×6 grid. The chart's 24 color patches have a spectral reflectance intended to mimic those of natural objects such as human skin, foliage, and flowers. In FIG. 9, a "naked" representation, i.e. without housing, of a real-time color indication device 900 is shown, in accordance with an embodiment of the invention. The device 900 is used for the method 90, and comprises a color sensor, which in turn comprises a light source and one or more color sensing elements (here not shown). The light source is, for example, a LED, such as, e.g., a commercially available white LED. Typically, light sources are characterized by their spectral power distribution (SPD). An SPD of a light source, here, for example, the LED of the device's color sensor, can be measured by a spectrophotometer 901, and is plotted by power P as a function of wavelength λ. An SPD, here, for example, light spectrum 902, plots the total output power of a light source, here, for example, the LED of the color sensor. For each wavelength or wavelength band, the SPD outlines how much optical power the light source emits. Wavelength λ is plotted in nm, whereas spectral power P is usually measured in Watts per nanometer, (W/nm), and is often normalized as an arbitrary unit such as power or intensity. The method 90 further uses a reference color pallet 903, which is the reference color pallet of colors to be illuminated by the LED light source (comprised in the color sensor) of the device 900. Reference color pallet may be any user-determined number of colors by which the light spectrum 902 of the LED light source may be analyzed. In one example, reference color pallet may be a Munsell or Macbeth color chart that may include, for example, about 8 to about 24 colors. Corresponding with the reference color pallet 903, here represented as a MacBeth chart, the spectral reflectance data 904 are depicted of the 24 colors in the MacBeth chart, wherein the 24 lines (or line colors) of the graphic correspond to the MacBeth chart colors. Reflectance spectrophotometers measure color by flashing light onto the surface of a sample and measuring the percentage of spectral reflectance of different wavelengths. The reference color pallet 903, here the MacBeth chart, or in particular one of the colors thereof, is illuminated by the LED light source, and a reflectance spectrophotometer 905 is used to measure reflected colors of the MacBeth chart, resulting in the spectral reflectance distributions 906, here, by means of example, in particular of red as color number 15 from the MacBeth color chart. Such a reflectance spectrophotometer or reflectance spectrometer may be any commercially available spectrometer, for measuring the amount of light reflected by a surface as a function of wavelength to produce a reflectance spectrum. Referring again to the existence of S, M, and L cones of the human, having a peak spectral sensitivity at 440, 540, and 560 nm respectively, it is now mentioned that LMS (long, medium, short) is also a color space that can be used, such as, e.g., XYZ or Lab color spaces from above. In particular, LMS represents the response of the three types of cones of the human eye, named for their responsivity (sensitivity) peaks at long, medium, and short wavelengths. Whereas the method 90 also makes use of the human eye characteristics, such characteristics are taken into account for either a colorblind as well as a non-colorblind person to be compared with. Hence, LMS values for a non-colorblind person's eye 907 are considered, as well as, for example, L'MS values for a colorblind person's eye 908 having a deficiency for the L cones, whereas M and S cones are undamaged and thus M and S values being comparable to those of a non-colorblind person. The specific example L'MS is now further described, although it is noted that other types of deficiency (e.g., only on M, only on S, or any combination of L, M and/or S) may also occur and hence be considered for applying a correction. Both LMS and L'MS curves are now considered as illustrated with the graph 909. The deficiency of L' for the colorblind person, is here indicated (and encircled) as a difference δ compared to the L curve. More specifically, here, as compared to the L curve, the curve L' has shifted for an amount δ towards the left, or towards the M curve. This means that, for example, the curve L' has shifted for 10 nm towards the left as compared to the curve L. Hence, the overlap between L' curve and M curve will be larger than the overlap of L curve with M curve. In other words, less red or reddish will be distinguishable from green or greenish for the colorblind person with the deficiency of L' as illustrated here. It is noted that the color vision deficiency could be more than just a shift in wavelength or nm. According to an embodiment, the L' curve (and/or M' curve, and/or S' curve) represents, as compared to the L curve (and/or M curve, and/or S curve), for example, a difference in amplitude, and/or in width, and/or in form or shape, all or not in combination with a shift in wavelength or nm. In a further step of the method 90, both LMS and L'MS spectra in graph 909 are combined with the spectral reflectance distribution 906, here in particular as a red reflectance curve. This results in the red LMS and L'MS spectra as depicted in further graph 910, as well as how this can be interpreted in the chromaticity diagram 911, wherein the red color 912 is seen by the non-colorblind person and the red color 913 is seen by the colorblind person with deficiency L'. An arrow is also depicted (in between the appointed colors 912, 913) to indicate the color shift and hence deficiency of such colorblind person, here specifically shown on red as color number 15 from the MacBeth color chart. Having now explained the basis for defining a colorblind deficiency in comparison with a non-colorblind person, the method 90 for also correcting such deficiency will now be further described using mathematical formula.

For the mathematics we start, for example, with CIE color match functions or XYZ values in XYZ color space, and this for the visible wavelength range from 380 nm to 780 nm. Hence, all colors that are visible for the human eye (of a non-colorblind person) are herewith considered. Those XYZ values are also known as the CIE XYZ standard observer color matching functions as earlier discussed with FIG. 3. It is further known from the art that the colors in XYZ values from the XYZ color space can be transformed to LMS values in the LMS color space. As, for example, used by Dolby Laboratories, Inc© in their white paper entitled "Perceptual Color Volume—Measuring the Distinguishable Colors of HDR and WCG Displays" from Jaclyn Pytlarz and Robin Atkins (2023 Version 7.2), the following formula for L, M and S respectively as a function of X, Y and Z can be applied for each wavelength in the visible range (further referred to as λ vis):

$$L = 0.3593X + 0.6976Y - 0.0359Z$$

$$M = -0.1921X + 1.1005Y + 0.0754Z$$

$$S = 0.0071X + 0.0748Y + 0.8433Z$$

Or in matrix format we have $$\begin{bmatrix} L \\ M \\ S \end{bmatrix}_{\lambda\,vis} = \begin{bmatrix} 0.3593 & 0.6976 & -0.0359 \\ -0.1921 & 1.1005 & 0.0754 \\ 0.0071 & 0.0748 & 0.8433 \end{bmatrix} \times \begin{bmatrix} X \\ Y \\ Z \end{bmatrix}_{\lambda\,vis}$$

It is noted that the LMS values or spectra of a non-colorblind person are depicted in graph 909 of FIG. 9. Also shown in this graph 909 are the L'MS values or spectra of a colorblind person having deficiency L', while illustrating the L' curve in particular. Consider now the deficiency of a colorblind person can be either on L, M and/or S cones, then L'M'S' values need to be considered. In matrix format we have $$\begin{bmatrix} L' \\ M' \\ S' \end{bmatrix}_{\lambda\,vis} = \begin{bmatrix} 0.3593 & 0.6976 & -0.0359 \\ -0.1921 & 1.1005 & 0.0754 \\ 0.0071 & 0.0748 & 0.8433 \end{bmatrix} \times \begin{bmatrix} X' \\ Y' \\ Z' \end{bmatrix}_{\lambda\,vis}$$

It is noted that the same factors can be multiplied with X'Y'Z' to achieve L'M'S' as was done for XYZ to calculate LMS. This is particularly the case since the X', Y' and/or Z' are measured each for a possible shift in wavelength (in nm range, e.g., 10 nm) for X, Y and/or Z respectively. It is further noted, that possibly, only one of X, Y and Z, or one of L, M and S is shifted representing the deficiency of the colorblind person, as, for example, illustrated in FIG. 9 with L'MS, and hence not necessarily all curves are shifted. It is also possible that the spectra represent a different shift for L, M and S respectively for resulting in L', M' and S'.

The above LMS values and L'M'S' values respectively for each wavelength in the visible range i.e. λ vis, can now further be used together with the spectral reflectance distribution of some chosen colors that are sensed or scanned. Such chosen colors can also be referred to as a training set of colors, for which, for example, some colors from the MacBeth color chart could be selected. FIG. 9 is again referred to wherein the spectral reflectance distribution 906 is depicted of red as color number 15 from the MacBeth color chart, when being scanned by the color sensor of the device 900, and hence being illuminated by its LED light source as described above. The chosen colors can be different from this color number 15, though not necessarily. For example, and for simplicity reasons, 3 colors are chosen. For each of these 3 chosen colors the spectral reflectance distribution can be measured respectively, again for each wavelength in the visible range (λ vis). Next, the overall LMS values and overall L'M'S' values for each of the chosen colors respectively can be calculated as the sum of products of the spectral reflectance distribution with the LMS values and L'M'S' values respectively for each wavelength in the visible range (λ vis). It is noted that more than 3 colors could also be chosen for the training set of colors, however preferably a rather limited set of, e.g., 3 colors is chosen to have a more accurate correction for the colorblind person to be defined. It is further noted that in case too many colors are chosen, this will result in a linear regression and hence less precise (and more averaged) correction.

For defining the correction that is needed to apply on the colors for a colorblind person, we can now use the following formula for the overall LMS values and overall L'M'S' values respectively: LMS=C×L'M'S' wherein C is the correction matrix for the correction to be applied for a colorblind person such that the corrected color for the colorblind person corresponds to the real-life sensed or scanned color for a non-colorblind person. Referring back to FIG. 9, this means that, in order to see color 912 in the chromaticity diagram 911 for a colorblind person having, for example, a deficiency L', the real color that should be shown, scanned and seen by a non-colorblind person is color 913. The correction to be applied for the colorblind person is based on the correction matrix.

Or in matrix format we have $$\begin{bmatrix} L \\ M \\ S \end{bmatrix} = \begin{bmatrix} c_{11} & c_{12} & c_{13} \\ c_{21} & c_{22} & c_{23} \\ c_{31} & c_{32} & c_{33} \end{bmatrix} \times \begin{bmatrix} L' \\ M' \\ S' \end{bmatrix}$$

This also means that the correction matrix C=LMS×(L'M'S')$^{-1}$

Or in matrices we have $$\begin{bmatrix} c_{11} & c_{12} & c_{13} \\ c_{21} & c_{22} & c_{23} \\ c_{31} & c_{32} & c_{33} \end{bmatrix} = \begin{bmatrix} L \\ M \\ S \end{bmatrix} \times \begin{bmatrix} L' \\ M' \\ S' \end{bmatrix}^{-1}$$

Figure 6:
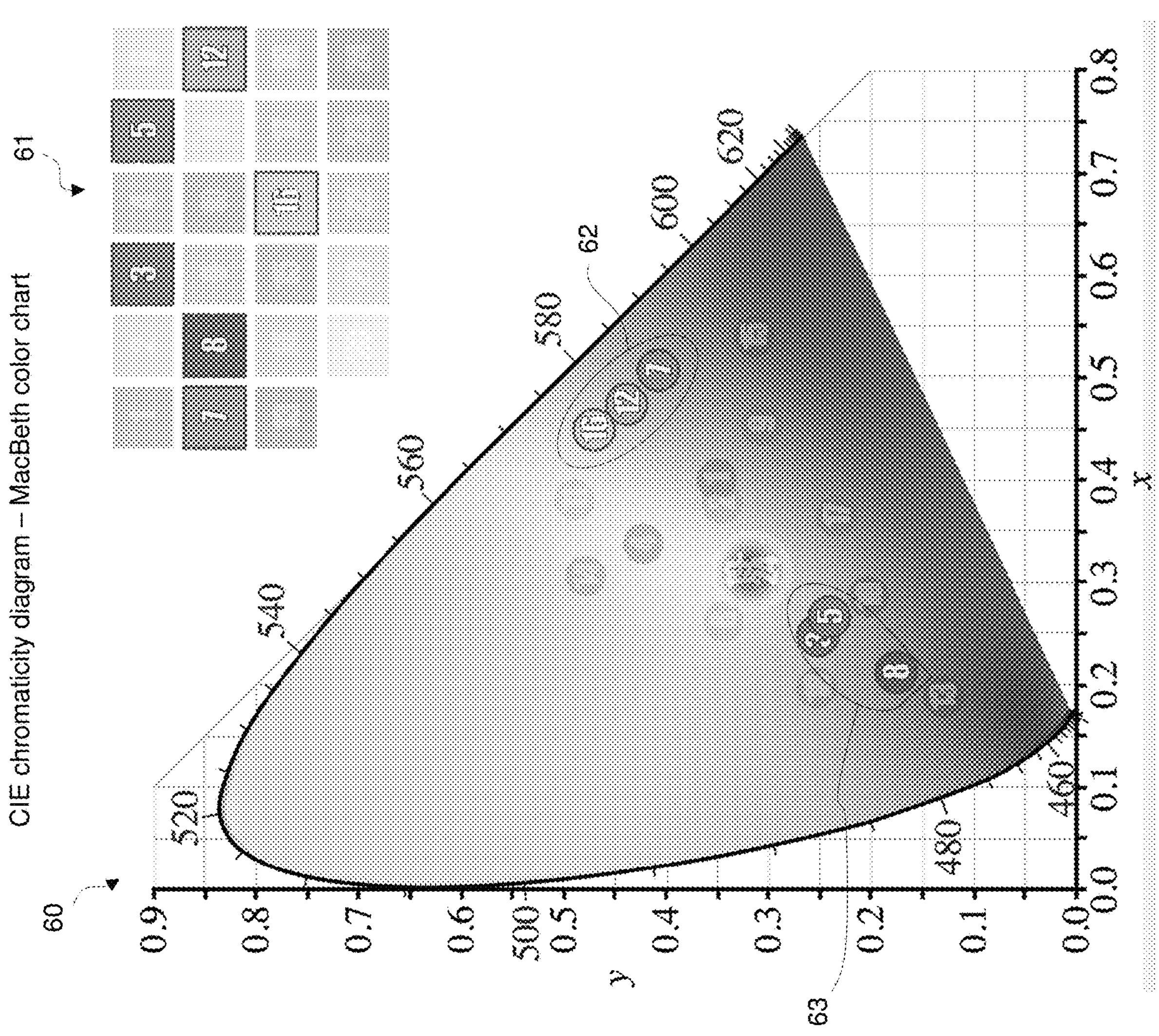
FIG. 6 shows the CIE chromaticity diagram in combination with the MacBeth color chart.

It is now mentioned again that in the example above, 3 colors are chosen as a training set of colors used to define the correction matrix C. More specifically, for example, these 3 colors are selected from the MacBeth color chart. According to an embodiment, the 3 selected colors are chosen within a certain region of colors or wavelengths, e.g., being located close to each other i.e. only few nanometers apart, and hence representing, for example, the same color shade (such as blueish, reddish, yellowish, greenish etc.). FIG. 6 shows the CIE chromaticity diagram 60 in combination with the MacBeth color chart 61. Moreover, the 24 colors of the MacBeth color chart 61 are indicated in the CIE chromaticity diagram 60. In addition, 2 sets 62, 63 of 3 colors are indicated and for each set the 3 colors being encircled, i.e. one set 63 being located in the blue region, whereas the other set 62 is located in the amber region. The blue region set 63 comprises the color numbers 3, 5 and 8 of the MacBeth color chart 61, whereas the amber region set 62 comprises the color numbers 7, 12 and 16 of the MacBeth color chart 61.

Figure 10:
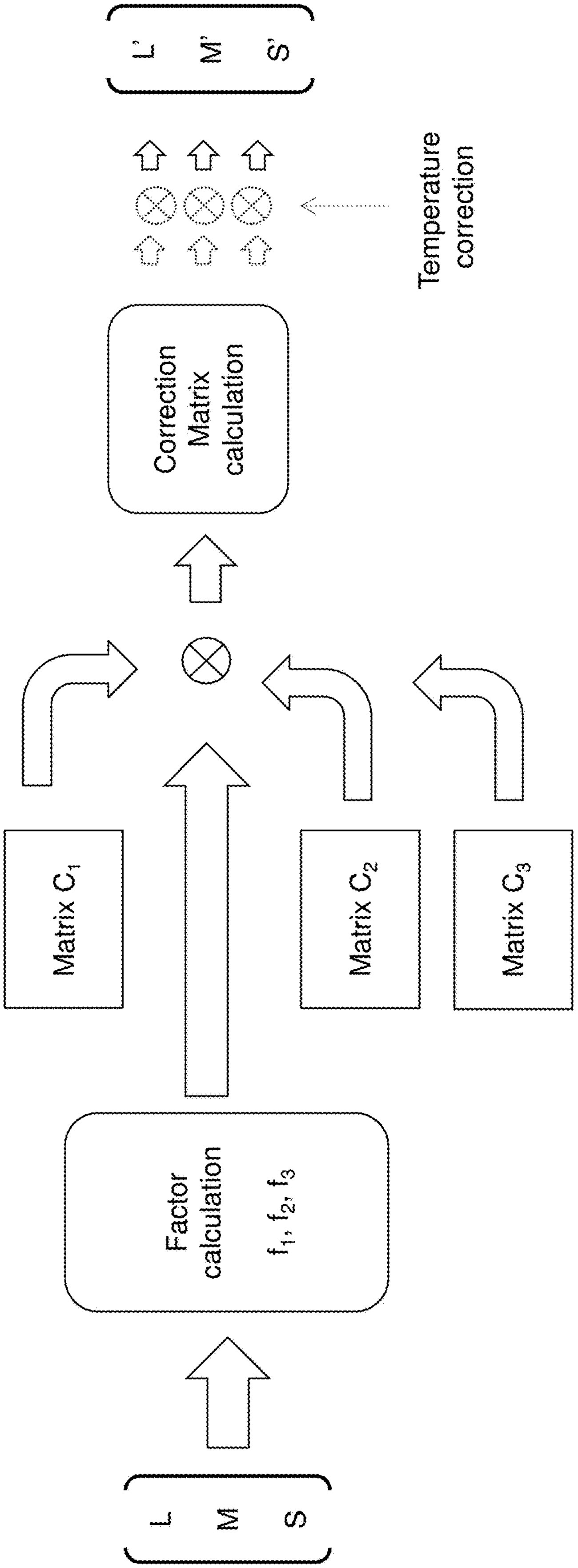
FIG. 10 shows a pipeline embodiment in accordance with the invention, representing a flow for the determination of the correction needed for a colorblind person such that he/she sees a corrected color corresponding to the scanned color seen by a non-colorblind person, wherein the determination is based on factor calculations and matrices, and possibly including also a temperature correction.

It is moreover noted that instead of choosing just one region corresponding to 3 colors for defining the correction matrix, two or more regions could also be chosen. In this case, the correction matrix becomes a combination of multiple corrections to be applied. And hence, a total correction matrix is calculated based on these multiple corrections. FIG. 10 shows a pipeline embodiment in accordance with the invention, representing a flow for the determination of the correction needed for a colorblind person such that the corrected color for the colorblind person corresponds to the real-life sensed or scanned color for a non-colorblind person. Referring back to FIG. 9, this means that, in order to see color 912 in the chromaticity diagram 911 for a colorblind person having, for example, a deficiency L', the real color that should be shown, scanned and seen by a non-colorblind person is color 913. The correction for the colorblind person is based on the correction matrix. This determination of the correction is now based on the calculations of weight factors $f_1$, $f_2$, $f_3$ and correction matrices $C_1$, $C_2$, $C_3$ for defining the total correction matrix $C_{total}$. As indicated with dotted signs and arrows, the flow may possibly also include a temperature correction to be applied. Thus, by means of example, here, the correction is defined by 3 matrices and corresponding 3 weight factors, and hence for the total correction matrix, we, for example, have $$C_{total} = f_1 \times C_1 + f_2 \times C_2 + f_3 \times C_3 \text{ wherein } f_1 + f_2 + f_3 = 1.$$

Or in matrix formula, we could have $$\begin{bmatrix} L \\ M \\ S \end{bmatrix} = (f_1 \times C_1 + f_2 \times C_2 + f_3 \times C_3) \times \begin{bmatrix} L' \\ M' \\ S' \end{bmatrix}$$

For the total correction matrix, we would then have $$C_{total} = (f_1 \times C_1 + f_2 \times C_2 + f_3 \times C_3) = \begin{bmatrix} L \\ M \\ S \end{bmatrix} \times \begin{bmatrix} L' \\ M' \\ S' \end{bmatrix}^{-1}$$

The above method can also be calculated in XYZ color space.

It is noted that the above color indicating and/or color correcting method (in relation to the description, e.g., of FIG. 9) could be incorporated in a—possibly standalone—device (as described, e.g., with FIG. 7) for aiding people having color vision deficiency.

As regard to the XYZ color space, XYZ coordinates for colors are particularly known in the high-end professional video world, mainly to adjust different colors (LEDs) to each other. It is herewith noted that, even in the professional video industry, it is not common to work with XYZ, but usually is performed on normal RGB values (scalars) that assume that each Red, Green and Blue has a fixed XYZ value (let be if this is even known and considered). There is no one in the colorblind industry who has ever made the connection between XYZ and LMS which is fundamental, because then you are no longer bound to the fact on which monitor or display you display the colors, as long as you know their XYZ values (or full spectrum of the colors). Hence, with the present invention, the measurement (for indicating a color) and correction of colors can occur with display or monitor independence. In other words, independent of the display or monitor being used, the measurement and correction of colors is accurately and consistently applied.

Figure 11:
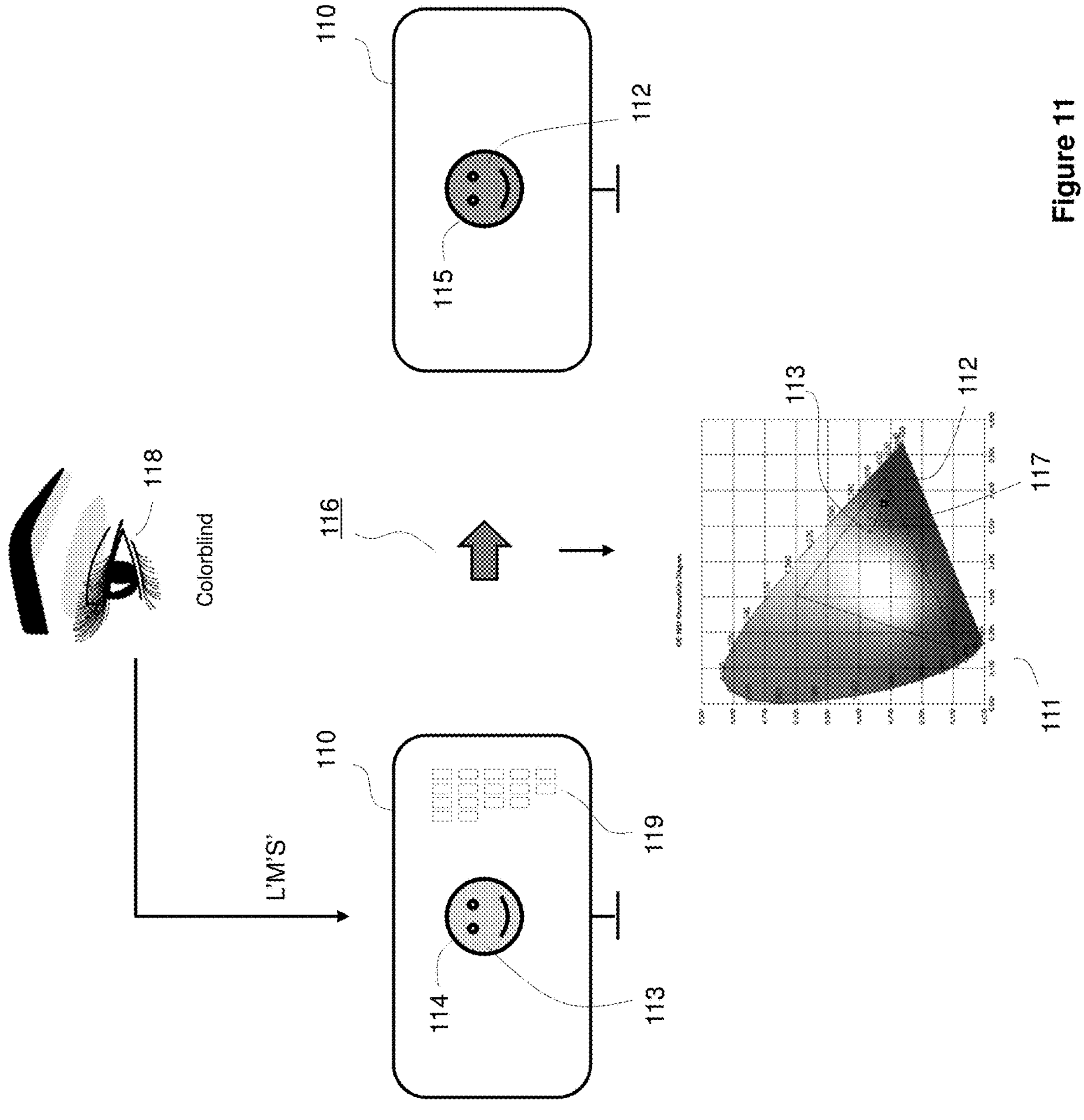
FIG. 11 illustrates schematically an embodiment of a method for correcting a color for a color vision deficiency of a colorblind person, which is needed to be applied for this colorblind person such that he/she could see the color as a non-colorblind person would see, in accordance with the invention.

While referring now to FIG. 11, an embodiment is now described, particularly referring to the method 116 only for correcting color for a colorblind person, i.e. a person having a color vision deficiency, in accordance with the invention. The colorblind person's eye 118 is characterized by a deficiency L'M'S' being indicated in the drawing. It is specifically noted that now particularly and only the method is referred to and hence not the device (for example, as earlier described) that can be used to incorporate and/or apply the method. Consider, for example, the surface of a multimedia apparatus, such as a display 110, comprising a plurality of pixels 119. The above mentioned method or any alternative method for determining the corrected color for a colorblind person is not limited to one color, but could be applied to every color of every pixel in, for example, a display, a television set, AR or VR glasses or any kind of particular display that is viewed by a colorblind person. Once a color vision deficiency (L'M'S') is determined of a colorblind viewer having this color vision deficiency, the above mentioned method could be applied, possibly real-time in a video processing system that converts, for example, RGB values to R'G'B' values (both given or represented in XYZ, and hence vector quantities and not scalar quantities (e.g., single values) are determined). The R'G'B' values are then a representation of the corrected color for the colorblind person that corresponds to the real-life sensed color for a non-colorblind person. This can subsequently be done for every pixel in the display. Every display has particular primary R, G and B colors, wherein each of these primary colors correspond to their particular XYZ value. In some cases the corrected colors R'G'B' cannot be shown (as they may contain negative values). Hence, clipping—which means putting an artificial limitation to adding, for example, color to another color (e.g., red or green to blue)—to the nearest available color that can be shown on the display is performed.

An embodiment of the application of the method 116 is schematically illustrated in FIG. 11 by means of showing first, before applying the method 116, a picture 114 on the display 110 having a color 113. After the method 116 has been applied, a picture 115 having a color 112 is shown. The picture 115 is in fact the same (in form and shape) as the picture 114, but its color has changed from color 113 towards color 112. The application of method 116 thus allows for the colorblind person to finally see (in the right display) the color 112 as a non-colorblind person would initially see (in the left display). Both the colors 112, 113 are also indicated in the CIE chromaticity diagram 111, while showing by means of the arrow 117, that the color 113 initially seen (in the left display) by the colorblind person has to be corrected such that this colorblind person finally sees the color 112, which would be initially seen (in the left display) by a non-colorblind person. The correction of the color is needed for the colorblind person in order to see a color which closely corresponds to a real-life and (almost) true version of such color for a non-colorblind person, having no color vision deficiency, wherein an "almost" true version of such color means within color within a predetermined threshold or closeness of accuracy as compared to the true version of such color.

Combinability of Embodiments and Features

This disclosure provides various examples, embodiments, devices, methods, and systems for continuous and accurate measurement of a color (or color surface) being scanned, and herewith providing a description such as the name of the scanned color (of the surface). In particular, the device may comprise a display for displaying the name of the scanned color. Further, this disclosure provides examples, embodiments, devices, methods, and systems for adjustment of color in that another color than the scanned color is proposed and, e.g., displayed on the device, wherein the other color comes close or corresponds to the interpretation of the scanned color, though being different from the scanned color, for a person being colorblind. Unless expressly stated, or unless such examples, embodiments, and features would be mutually exclusive, the various examples, embodiments, and features disclosed herein should be understood to be combinable with other examples, embodiments, or features described herein.

In addition to the above, further embodiments and examples include the following.

According to a first group of embodiments or examples:

1. A method for correcting a color of a surface for a color vision deficiency by use of a device, the device comprising:
   a color sensor for sensing a color of a surface being scanned by the color sensor, having a sensitivity curve, and the color sensor comprising one or more color sensing elements providing sensed information,
   a processor for determining the color of the scanned surface, wherein said determining being based on said sensed information, and being further based on calculations in XYZ color space, and
   a communication means for providing a description of the color of the scanned surface, wherein the method comprising the steps of
   indicating the color of the surface in accordance with a method comprising the steps of
   powering the device,
   bringing the color sensor of the device in ON-status,
   bringing the color sensor close to or onto a surface to be scanned of which a color should be sensed by the color sensor,
   scanning the surface to be scanned with the color sensor, and herewith sensing the color thereof to be sensed,
   providing sensed information of the color of the scanned surface to the processor,
   determining by the processor the color of the scanned surface based on said sensed information, and further being based on calculations in XYZ color space,
   providing a description of the color of the scanned surface,
   receiving or determining color vision deficiency,
   determining by the processor a correction of the color to be applied for said color vision deficiency such that the correction of the color for said color vision deficiency closely corresponds to a real-life and (almost) true version of the color in case of no color vision deficiency, wherein the correction being based on calculations in XYZ color space,
   applying the correction of the color, and
   providing the correction of the color via the communication means.
2. The method according to any one or a combination of one or more of 1 above and 3-11 below, wherein said determining a correction of the color to be applied for said color vision deficiency is based on mathematical formula, in particular matrix calculations with XYZ and/or LMS color space values.
3. The method according to any one or a combination of one or more of 1-2 above and 4-11 below, wherein the color sensor of the device being used, comprises a light source having an emission spectrum, and bringing the color sensor of the device in ON-status implies that the light source is activated.
4. The method according to 3 above, wherein the emission spectrum of the light source, together with said sensed information and the sensitivity curve of the color sensor, allow for calculations of XYZ values for the color of the scanned surface.

5. The method according to any one or a combination of one or more of 1-4 above and 6-11 below, wherein the processor of the device being used, is functioning real-time, and determining by the processor a correction of the color to be applied for said color vision deficiency is performed real-time.
6. The method according to any one or a combination of one or more of 1-5 above and 7-11 below, wherein the communication means of the device being used, is used for receiving the color vision deficiency and/or is a display.
7. The method according to 6 above, wherein the display comprises a user interface comprising selection options and/or buttons.
8. The method according to any one or a combination of one or more of 1-7 above and 9-11 below, wherein the device being used further comprises a power supply such as an energy storage module or a battery, and operating the device for performing the correcting method is enabled stand-alone.
9. The method according to any one or a combination of one or more of 1-8 above and 10-11 below, wherein the device being used further comprises energy harvesting elements, such as for example photovoltaic cells, and operating the device for performing the correcting method is further enabled stand-alone.
10. The method according to any one or a combination of one or more of 1-9 above and 11 below, wherein the processor of the device being used, is capable of storing information such as adaptable settings and/or a lookup table and/or the color and the correction thereof.
11. The method according to any one or a combination of one or more of 1-10 above, wherein the device being used further comprises a temperature sensor and/or movement sensor or a gyroscope, and applying the correcting method is taking into account temperature and/or movement sensitivities.
12. A method for a correction of a color of a display comprising a plurality of pixels of which one or more are emitting said color, wherein the correction is intended for correcting a color vision deficiency, the method comprising the steps of
    retrieving an original color value in XYZ color space of the color for one or more of the plurality of pixels emitting the color,
    receiving or determining the color vision deficiency,
    determining the correction of the color to be applied for the color vision deficiency, wherein the correction being based on calculations in XYZ color space applying the correction of the color, and
    displaying for one or more of the plurality of pixels emitting the color, the correction of the color.
13. The method of claim 12, wherein the determining the correction of the color to be applied for the color vision deficiency is real-time, and the method is a real-time method.
14. The method of claim 12 or 13, wherein the determining the correction of the color to be applied for the color vision deficiency is based on the original color value and the color vision deficiency.
15. A display comprising:
    a plurality of pixels of which one or more are emitting a color,
    a processor for calculating (real-time), for one or more of the plurality of pixels emitting the color, a correction of the color to be applied for a color vision deficiency, using the method of any one or a combination of one or more of claims 12 to 14, such that the correction of the color for said color vision deficiency corresponds closely to a real-life and (almost) true version of the color in case of no color vision deficiency, and
    a memory for storing one or more factors related to said color vision deficiency, wherein said processor is receiving and interpreting said one or more factors and is converting these to (real-time) computing values to be applied.

According to a second group of embodiments or examples:

1. A device for sensing a color of a surface, the device comprising:
    a color sensor configured to sense a color of a surface scanned by the color sensor, the color sensor comprising one or more color sensing elements that obtain and provide sensed information,
    a processor configured to determine the color of the surface scanned by the color sensor, wherein the processor is configured to determine the color of the surface based on said sensed information, and the processor being further configured to determine the color of the surface based on calculations in XYZ color space, and
    a communicator configured to provide a description or indication of the color of the scanned surface based on the determinant of the processor.
2. The device according to any one or a combination of any of 1 above and 3-10 below, wherein the processor is configured to determine the color of the surface scanned by the color sensor in real-time.
3. The device according to any one or a combination of any of 1-2 above and 4-10 below, wherein the color sensor comprises a light source having an emission spectrum.
4. The device according to any one or a combination of any of 1-3 above and 5-10 below, wherein the emission spectrum of the light source, together with said sensed information and a sensitivity curve of the color sensor, allow for calculations of XYZ values by the processor for the color of the scanned surface.
5. The device according to any one or a combination of any of 1-4 above and 6-10 below, wherein said sensed information and a sensitivity curve of the color sensor, allow for calculations of XYZ values by the processor for the color of the scanned surface.
6. The device according to any one or a combination of any of 1-5 above and 7-10 below, wherein the communicator includes a display or an audio device.
7. The device according to any one or a combination of any of 1-6 above and 8-10 below, wherein the device includes a display that includes a user interface that includes selection options and/or buttons.
8. The device according to any one or a combination of any of 1-7 above and 9-10 below, wherein the device further comprises a power supply or an energy storage module or a battery such that the device is enabled to function as a stand-alone device.
9. The device according to any one or a combination of any of 1-8 above and 10 below, wherein the device comprises one or more energy harvesting elements or one or more photovoltaic cells such that the device is enabled to function as a stand-alone device.

10. The device according to any one or a combination of any of 1-9 above, wherein the device further comprises a temperature sensor and/or movement sensor or a gyroscope.

11. A method for determining a color of a surface using a color-sensing device, the method comprising:

determining by a processor the color of the surface scanned by a color sensor based on sensed information obtained by the color sensor, wherein the processor receives said sensed information and determines the color of the surface based on said sensed information and calculations in XYZ color space.

12. The method according to any one or a combination of any of 11 above and 13-20 below, further comprising obtaining by the color sensor said sensed information received by the processor, wherein the color sensor comprises one or more color sensing elements that obtain said sensed information.

13. The method according to any one or a combination of any of 11-12 above and 14-20 below, further comprising providing by a communicator a description or an indication of the color of the scanned surface based on the determination of the processor.

14. The method according to any one or a combination of any of 11-13 above and 15-20 below, wherein the processor determines the color of the surface scanned by the color sensor in real-time.

15. The method according to any one or a combination of any of 11-14 above and 16-20 below, further comprising emitting a light onto said surface using a light source having an emission spectrum.

16. The method according to any one or a combination of any of 11-15 above and 17-20 below, wherein the emission spectrum of the light source, together with said sensed information and a sensitivity curve of the color sensor, allow for calculations of XYZ values by the processor for the color of the scanned surface.

17. The method according to any one or a combination of any of 11-16 above and 18-20 below, wherein said sensed information and a sensitivity curve of the color sensor, allow for calculations of XYZ values by the processor for the color of the scanned surface.

18. The method according to any one or a combination of any of 11-17 above and 19-20 below, further comprising providing by a communicator a description or an indication of the color of the scanned surface based on the determination of the processor, wherein the communicator includes a display or an audio device.

19. The method according to any one or a combination of any of 11-18 above and 20 below, wherein the device includes a display that includes a user interface that includes selection options and/or buttons.

20. The method according to any one or a combination of any of 11-19 above, further comprising sensing a temperature of the surface and/or a movement of the color sensor relative to the surface.

21. A device for sensing a color of a surface, the device comprising:

a processor configured to determine the color of the surface scanned by a color sensor, wherein the processor is configured to determine the color of the surface based on sensed information obtained by a color sensor, wherein the processor is configured to determine the color of the surface based on calculations in XYZ color space.

22. The device according to 21 above, further comprising said color sensor, wherein the color sensor comprises one of more color sensing elements that obtain and provide said sensed information.

23. The device according to any one or a combination of any of 21 and 22, further comprising a communicator configured to provide a description or indication of the color of the scanned surface.

24. The device according to any one or a combination of any of 21-23 above, wherein the device is further configured to correct a color of the surface for a color deficiency of a user, wherein the device further comprises a color sensor for sending the color of the surface being scanned by the color sensor 25. The device according to any one or a combination of any of 21-24 above, wherein the processor receives the sensed information from a memory storage that stores the sensed information that has been obtained by the color sensor.

26. A method of correcting a color of a surface for a vision deficiency using the device according to any one or a combination of any of 1-10 and 21-25 above, the method comprising:

scanning the surface with a color sensor;

determining a color of the surface based on said sensed information and based on calculations in XYZ color space;

providing a description, indication, or determination of the color of the scanned surface;

receiving or determining a color vision deficiency;

determining by the processor of the device or by another processor a correction of the color to be applied for said color vision deficiency such that the correction of the color for said color vision deficiency closely corresponds to a real-life or almost true version of the color in case of no color vision deficiency, wherein the correction is based on calculations in XYZ color space;

applying the correction of the color; and providing the correction of the color via a communicator or other display.

27. The color correction method according to any one or a combination of one or more of 26 above and 28-30 below, wherein said determining a correction of the color to be applied for said color vision deficiency is based on one or more mathematical formulas, or one more mathematical formulas that include calculations with XYZ and/or LMS color space values.

28. The color correction method according to any one or a combination of one or more of 26-27 above and 29-30 below, wherein the color sensor of the device comprises a light source having an emission spectrum.

29. The color correction method according to any one or a combination of one or more of 26-28 above and 30 below, wherein the correction of the color to be applied for said color vision deficiency is performed in real-time.

30. The color correction method according to any one or a combination of one or more of 26-29 above, further comprising storing and using information including adaptable settings and/or a lookup table and/or the color and the correction thereof and/or taking into account temperature and/or movement sensitivities.

31. A system correcting a color of a surface for a vision deficiency, the system comprising the device according to any one or a combination of any of 1-10 and 21-25 above, wherein the system is configured to:

scan the surface with a color sensor;

determine a color of the surface based on said sensed information and based on calculations in XYZ color space;

provide a description, indication, or determination of the color of the scanned surface;

receive or determine a color vision deficiency;

determine by the processor of the device or by another processor a correction of the color to be applied for said color vision deficiency such that the correction of the color for said color vision deficiency closely corresponds to a real-life or almost true version of the color in case of no color vision deficiency, wherein the correction is based on calculations in XYZ color space;

apply the correction of the color; and provide the correction of the color via a communicator or other display.

32. The color correction system according to any one or a combination of one or more of 31 above and 33-35 below, wherein said determining by the process of a correction of the color to be applied for said color vision deficiency is based on one or more mathematical formulas, or one more mathematical formulas that include calculations with XYZ and/or LMS color space values.

33. The color correction system according to any one or a combination of one or more of 31-32 above and 34-35 below, wherein the color sensor of the device comprises a light source having an emission spectrum.

34. The color correction system according to any one or a combination of one or more of 31-33 above and 35 below, wherein the correction of the color by the processor to be applied for said color vision deficiency is performed in real-time.

35. The color correction system according to any one or a combination of one or more of 31-34 above, wherein the system is configured to store and use information including adaptable settings and/or a lookup table and/or the color and the correction thereof and/or taking into account temperature and/or movement sensitivities.

The invention claimed is:

1. A method for correcting a color of a surface for a color vision deficiency, the method comprising the steps of:

providing a device that includes a spectrometer that senses a color of a surface being scanned by the spectrometer, the spectrometer having a spectral sensitivity curve, and the spectrometer comprising one or more color sensing elements providing sensed information, a processor for determining the color of the scanned surface, wherein said determining is based on said sensed information, and said determining being further based on calculations in XYZ color space, and a communication means for providing a description of the color of the scanned surface; indicating the color of the surface, wherein indicating the color of the surface includes scanning a surface with the spectrometer, and thereby obtaining sensed information relating to a color thereof to be sensed, providing the sensed information of the color of the scanned surface to the processor, determining by the processor the color of the scanned surface based on said sensed information, and further being based on calculations in XYZ color space, and providing a description of the color of the scanned surface;

receiving or determining color vision deficiency;

determining by the processor a correction of the color to be applied for said color vision deficiency such that the correction of the color for said color vision deficiency closely corresponds to a real-life and true or almost true version of the color in case of no color vision deficiency, wherein the correction being based on calculations in XYZ color space;

applying the correction of the color; and providing the correction of the color via the communication means.

2. The method of claim 1, wherein said determining a correction of the color to be applied for said color vision deficiency is based on one or more mathematical formulas, or one more mathematical formulas that include calculations with XYZ and/or LMS color space values.

3. The method of claim 1, wherein the processor of the device functions in real-time, and determining by the processor the correction of the color to be applied for said color vision deficiency is performed in real-time.

4. The method of claim 1, wherein the device further comprises a power supply or an energy storage module or a battery, and operating the device for performing the correcting method is enabled stand-alone.

5. The method of claim 1, wherein the processor of the device stores information including adaptable settings and/or a lookup table and/or the color and the correction thereof.

6. The method of claim 1, wherein the device further comprises a temperature sensor and/or movement sensor or a gyroscope, and applying the correcting method includes taking into account temperature and/or movement sensitivities.

7. The method of claim 1, wherein the spectrometer comprises a light source having an emission spectrum.

8. The method of claim 7, wherein the emission spectrum of the light source, together with said sensed information and the spectral sensitivity curve of the spectrometer, allow for calculations of XYZ values for the color of the scanned surface.

9. The method of claim 1, wherein the communication means receives the color vision deficiency and/or is a display.

10. The method of claim 9, wherein the display comprises a user interface comprising selection options and/or buttons.

11. The method of claim 1, wherein the device further comprises one or more energy harvesting elements such that the device is a stand-alone device.

12. The method of claim 11, wherein the one or more energy harvesting elements include photovoltaic cells.

13. The method of claim 1, wherein indicating the color of the surface further comprises powering the device, and bringing the spectrometer of the device in ON-status.

14. The method of claim 13, wherein indicating the color of the surface further comprises bringing the spectrometer close to or onto the surface to be scanned of which the color should be sensed by the spectrometer.

15. A color-indicating device comprising:

a spectrometer that senses a color of a surface being scanned by the spectrometer, the spectrometer having a spectral sensitivity curve, and the spectrometer comprising one or more color sensing elements providing sensed information;

a processor configured to determine the color of the scanned surface, the processor being arranged to receive the sensed information from the spectrometer, wherein said determining of the color being based on said sensed information, and said determining being further based on calculations in XYZ color space; and a communication means for providing a description of the color of the scanned surface, wherein the processor is configured to determine the color of the scanned surface based on said sensed information, and further being based on calculations in XYZ color space, provide a description of the color of the scanned surface, receive or determine a color vision deficiency, determine a correction of the color to be applied for said color vision deficiency such that the correction of the color for said color vision deficiency closely corresponds to a real-life and true or almost true version of the color in case of no color vision deficiency, wherein the correction being based on calculations in XYZ color space, apply the correction of the color, and provide the correction of the color via the communication means.

* * * * *